United States Patent [19]
Fiorini

[11] Patent Number: 5,740,173
[45] Date of Patent: Apr. 14, 1998

[54] ASYNCHRONOUS TRANSFER MODE (ATM) CELL ARRIVAL MONITORING SYSTEM

[75] Inventor: Paolo Fiorini, Arezzo, Italy

[73] Assignee: Telefonaktiebolaget Lm Ericsson, Stockholm, Sweden

[21] Appl. No.: 613,826

[22] Filed: Feb. 28, 1996

[51] Int. Cl.$^6$ ................................................. H04L 12/56
[52] U.S. Cl. ........................... 370/394; 370/473; 370/474
[58] Field of Search .................................. 370/392, 393, 370/394, 419, 429, 473, 474; 371/30, 31, 32

[56] References Cited

U.S. PATENT DOCUMENTS

| | | | |
|---|---|---|---|
| 5,151,899 | 9/1992 | Thomas et al. | 370/394 |
| 5,200,950 | 4/1993 | Foglar et al. | 370/219 |
| 5,280,470 | 1/1994 | Buhrke et al. | 370/232 |
| 5,309,438 | 5/1994 | Nakajima | 370/395 |
| 5,335,222 | 8/1994 | Kamoi et al. | 370/230 |
| 5,337,313 | 8/1994 | Buchholz et al. | 370/394 |
| 5,343,462 | 8/1994 | Sekihata et al. | 370/244 |
| 5,390,184 | 2/1995 | Morris | 370/353 |
| 5,414,707 | 5/1995 | Johnston et al. | 370/395 |
| 5,450,410 | 9/1995 | Hluchyj | 370/394 |
| 5,483,526 | 1/1996 | Ben-Nun et al. | 370/395 |
| 5,610,595 | 3/1997 | Garrabrant et al. | 370/394 |

FOREIGN PATENT DOCUMENTS

94/11974  5/1994  WIPO.

OTHER PUBLICATIONS

Annex C of Final Draft pr I–ETS 300 353 (Dec. 1994).
ITU–T Rec.I.363.1, Appendix III.
ITU–T SG 13 (WD 19 for the Interim Rapporteur's Meeting on Qu. 6.1/13, Stockholm, May 1995).

Lim, Hyo Taek, and Song, Joo Seok, "Cell Loss Recovery Method in B–ISDN/ATM Networks", *Electronics Letters*, vol. 31, No. 11, May 25, 1995, pp. 849–851.

Humblet et al, "Buffer Allocation For Frame Reassembly and Queueing in ATM Networks", Proceedings of the Conference on Computer Communications, Toronto, vol. 2, IEEE, pp. 510–515, Jun. 1994.

*Primary Examiner*—Hassan Kizou
*Attorney, Agent, or Firm*—Nixon & Vanderhye, P.C.

[57] ABSTRACT

A system is provided for monitoring cell arrival in an asynchronous transfer mode (ATM) network, particularly for the detection and handling of lost and misinserted cells. A received cell is accepted (i.e., the user data conveyed in its payload is used for the reassembly process of a transported user signal) if it is recognized as the next expected cell. Otherwise, an acceptance decision for the received cell is delayed if it is not recognized as the next expected cell. The delay occurs until either reception of a subsequent cell or until the acceptance decision is prompted by a predetermined condition of a user data buffer. The predetermined condition of the user data buffer is an emptying of the user data buffer to a point that reassembly of the transported user signal would be unstable. If necessary, dummy data is generated while delaying an acceptance decision for the received cell. An acceptance decision which is prompted by the predetermined condition of a user data buffer is made taking into account whether a cell whose acceptance decision has been delayed is present in the cell arrival buffer. In addition, the system makes a determination regarding whether cell losses or an insufficient cell delay variation (CDV) compensation causes the user data buffer to reach the predetermined condition.

44 Claims, 13 Drawing Sheets

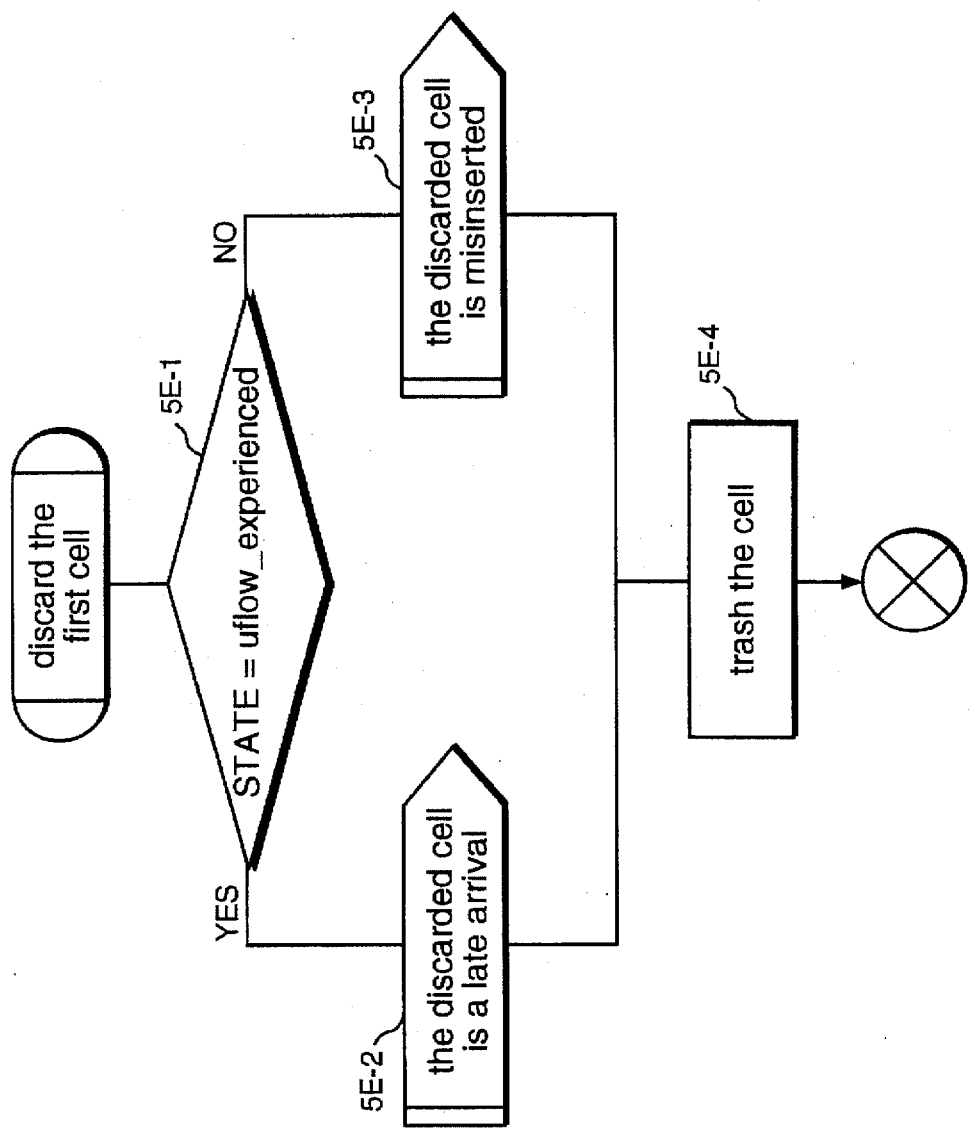

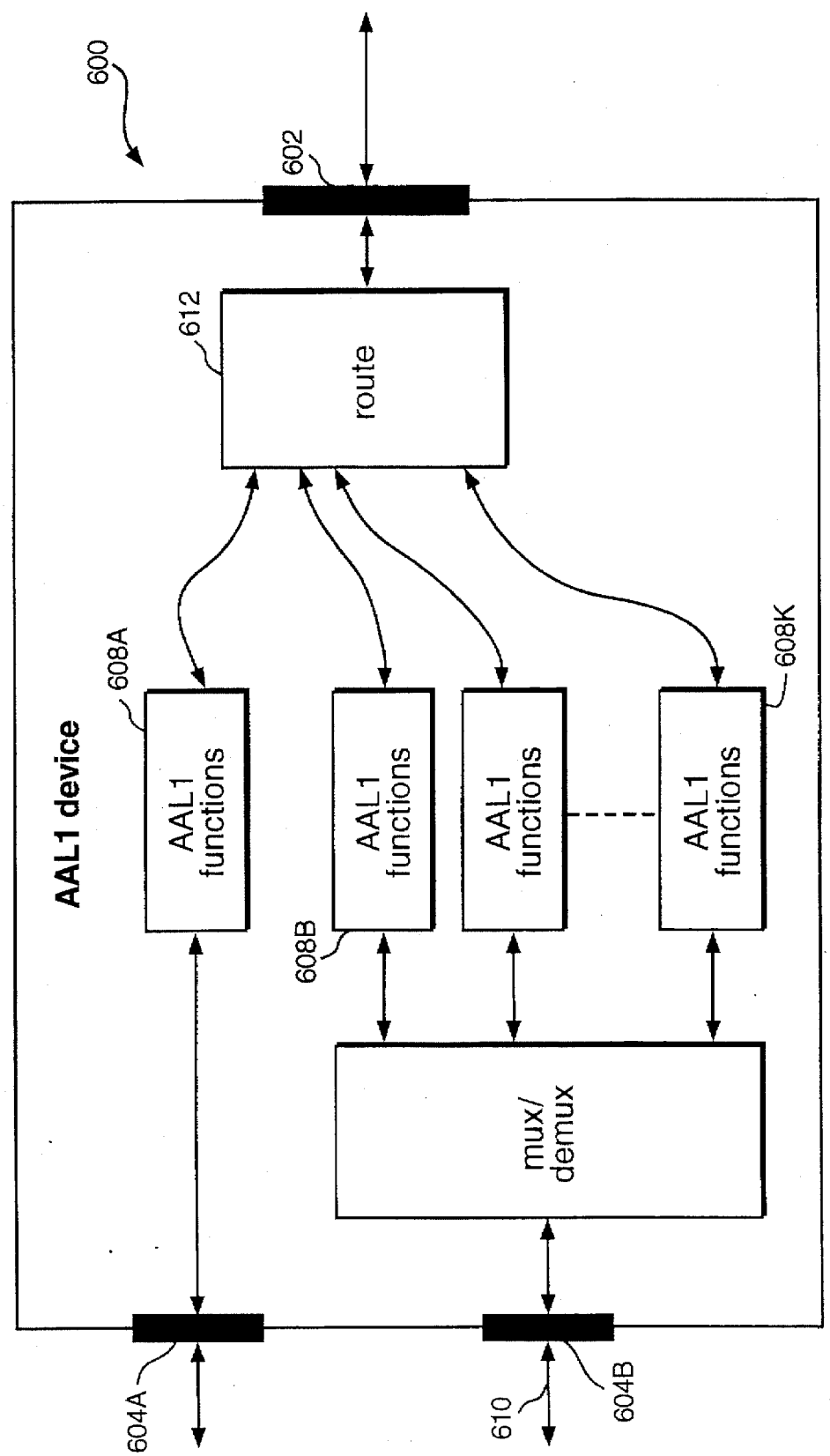

ASYNCHRONOUS TRANSFER MODE (ATM) CELL ARRIVAL MONITORING SYSTEM

BACKGROUND

1. Field of Invention

This invention pertains to telecommunications, and particularly to the monitoring of cell arrival in a telecommunications mode known as the asynchronous transfer mode.

2. Related Art and Other Considerations

The increasing interest for high band services such as multimedia applications, video on demand, video telephone, and teleconferencing has motivated development of the Broadband Integrated Service Digital Network (B-ISDN). B-ISDN is based on a technology know as asynchronous Transfer Mode (ATM), and offers considerable extension of telecommunications capabilities.

ATM is a packet-oriented transfer mode which uses asynchronous time division multiplexing techniques. Packets are called cells and have a fixed size. Transport of cells through the ATM network does not modify cell order, but does result in an unpredictable delay affecting each cell (e.g., although cells are generated periodically at a transmitter, cell arrival at a receiving unit is aperiodic). The delay experienced by cells is represented by an average delay plus a jitter. The jitter is commonly referred to as "Cell Delay Variation" (CDV).

Different types of ATM Adaption Layer (AAL) protocols are defined to allow the mapping of different types of signals in ATM cells and their transport over ATM networks. Specifically, the ATM Adaptation Layer of type 1 (AAL1) specified by ITU-T Recommendation I.363.1 is the protocol allowing the mapping of constant bit rate (CBR) signals into ATM cells and their transport over ATM networks. The AAL1 protocol is implemented, for example, in InterWorking Units (IWUs) allowing the interface of ATM networks with ISDN (also known as Narrowband ISDN or N-ISDN) networks.

At the transmitting end, where ATM cells are generated and their payload filled with segments of the CBR signal to be transported, the AAL1 protocol includes the insertion of a three bit sequence count (SC) in each cell (with consecutive cells having consecutive modulo 8 values of SC). According to ITU-T Recommendation I.363.1, the SC value is encoded in a part of the Sequence Number (SN) field and lies in a fixed position within the ATM cell. The SN field is protected from bit errors that may occur during the transport of the ATM cell through the ATM network by means of a three bit Cyclic Redundancy Check (CRC) code and an even parity bit. This protection allows the receiving end to identify the occurrence of such bit errors and, in some cases, to correct them. On the basis of these operations, the receiving end declares valid or invalid the SN field (and then also the included SC value) of each received cell.

In accordance with ITU-T Recommendation I.363.1, the operations associated with the handling of the AAL1 protocol can be classified as composed of two parts, namely the "Convergence Sublayer (SC)" functions and the "Segmentation and Reassembly (SAR) Sublayer" functions. In particular, the generation of the protection code for the SN field at the transmitting end and its use at the receiving end are tasks of the SAR sublayer.

Other aspects of ATM adaptation protocol are understood with reference to the literature, for example U.S. Pat. No. 5,414,707 to Johnston et al. and U.S. Pat. No. 5,343,462 to Sekihata et al.

Implementations of the AAL1 protocol typically include a cell arrival buffer in which one or two cells incoming from the ATM network are temporarily stored. After the cell(s) in the cell arrival buffer are validated, the segments of the user signal conveyed in their payload are stored in a user data buffer. A controller of the user data buffer, in response to timing signals, plays out a reassembled signal from the user data buffer.

The detection and handling of lost and misinserted cells is particularly problematic in network elements implementing the AAL1 protocol because of the critical impact of their occurrences on the reassembly of the CBR signal. A lost cell is a cell which has not reached the receiving end. A misinserted cell is a cell which has reached a wrong receiving end. Upon reception of each cell, determinations must be made (1) whether the received cell really belongs to the cell flow being received (or some other cell flow) and (2) whether some cells immediately preceding the received cell have been lost.

The industry has propounded various approaches for attempting to make such determinations, such as the following (set forth in ITU-T Rec. I.1.363, Appendix III): "Robust SN Analysis"; "Fast SN Analysis"; "User Data Buffer Fill Monitoring"; and, "Cell Arrival Monitoring". These four approaches are briefly summarized below.

In "Robust SN Analysis", decisions are made after the analysis of the sequence count values of two consecutively received cells. In other words, when a cell is received, it is stored in the cell arrival buffer pending arrival of the next cell. The "Robust SN Analysis" can be employed only if the delay sensitivity of a service which uses a constant bit rate signal allows introduction of the delay necessary to wait for the next cell.

In "Fast SN Analysis", decisions are made immediately upon analysis of the sequence count value of a received cell at the cell arrival buffer, without waiting for arrival of a next cell. Decisions are based on a comparison of the sequence count value of a received cell and the previously accepted cell. An implementation of "Fast SN Analysis" is described in ITU-T SG 13 (WD 19 for the Interim Rapporteur's Meeting on Qu. 6.1/13, Stockholm, May 1995).

In "User Data Buffer Fill Level Monitoring", the fill level of the user data buffer is monitored to derive information on fault conditions affecting cell flow. During normal conditions the fill level ranges between two threshold values that can be estimated taking into account the maximum CDV expected. Cells received when the user data buffer filling level lies between the two thresholds are immediately accepted. Cells received when the filling level exceeds the upper threshold are discarded as misinserted. Whenever the user data buffer filling level falls below the lower threshold, dummy information corresponding to one cell is generated because one cell is assumed to have been lost. "User Data Buffer Fill Level Monitoring" can be utilized only when an average time between two consecutive cells is large with respect to the CDV.

In "Cell Arrival Monitoring", cell interarrivals are monitored by means of a time driven counter. Each arrival is expected to lay within a time window established around the expected arrival instant. This method has the same constraints as "User Data Buffer Fill Level Monitoring".

Thus, specialized approaches have been developed to handle different services associated with different bit rates and delay sensitivities. In light of such approaches, it is difficult to implement an AAL1 that operates efficiently on signals at various bit rates. Moreover, in particular bit rate/delay sensitivity cases, the need of selecting a specific algorithm can lead to very unoptimized conditions because the information that can be derived from the cell flow analysis is often dependent not only on the service bit rate and the adopted initial delay, but also on the particular defective condition which is being handled. For reasons such as the foregoing, the selection of a specific algorithm is often very difficult.

What is needed, therefore, is a cell arrival monitoring system which is consistently suitable regardless of the service bit rate and delay sensitivity. Furthermore, it would be advantageous to unify the handling of services with different bit rate and delay sensitivities without reducing the robustness to defective conditions.

SUMMARY

A system is provided for monitoring cell arrival in an asynchronous transfer mode (ATM) network, particularly for the detection and handling of lost and misinserted cells. A received cell is accepted (i.e., the user data conveyed in its payload is used for the reassembly process of a transported user signal) if is recognized as the next expected cell. Otherwise, an acceptance decision for the received cell is delayed if it is not recognized as the next expected cell. The delay occurs until either reception of a subsequent cell or until the acceptance decision is prompted by a predetermined condition of a user data buffer. The predetermined condition of the user data buffer is an emptying of the user data buffer to a point that reassembly of the transported user signal would be unstable. If necessary, dummy data is generated while delaying an acceptance decision for the received cell.

An acceptance decision which is prompted by the predetermined condition of a user data buffer is made taking into account whether a cell whose acceptance decision has been delayed is present in the cell arrival buffer. In addition, the system makes a determination regarding whether cell losses or an insufficient cell delay variation (CDV) compensation causes the user data buffer to reach the predetermined condition.

Apparatus of the cell arrival monitoring system include a cell arrival buffer into which incoming ATM cells are loaded; a user data buffer (for containing the received data that has to be used for the reassembly of the transported constant bit rate signal); and a controller. The controller transfers user data included in a cell in the cell arrival buffer into the user data buffer if the controller recognizes the cell in the cell arrival buffer as the next expected cell. Otherwise the controller delays an acceptance decision for the cell if it is not recognized as the next expected cell until either reception of a subsequent cell in the cell arrival buffer or until the acceptance decision is prompted by a predetermined condition of a user data buffer.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 5E is a specification and description language (SDL) diagram showing steps executed by the ATM cell arrival monitoring system of FIG. 4 for distinguishing misinserted and late arrived cells.

FIG. 6 is a schematic view of an exemplary AAL1 device of a type which can utilize the cell arrival monitoring of the present invention.

DETAILED DESCRIPTION OF THE DRAWINGS

Figure 1:
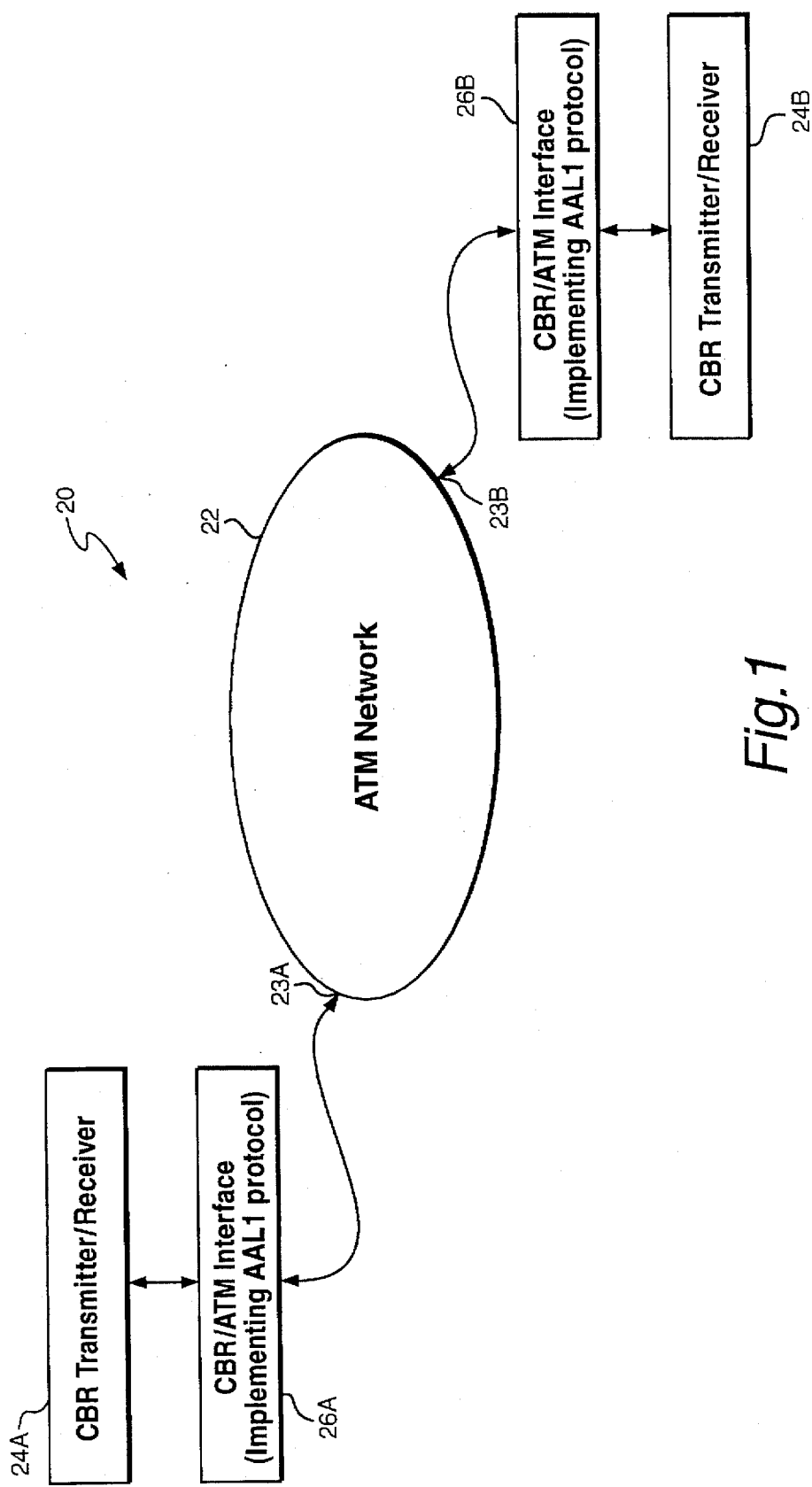
FIG. 1 is a schematic view of a telecommunications system including an asynchronous transfer mode (ATM) network.

FIG. 1 shows a telecommunications system 20 featuring an ATM network 22. Two constant bit rate transmitter/ receiver (CBR Tx/Rx) units 24A, 24B are shown connected to ATM network 22 at network nodes 23A, 23B via respective CBR/ATM interface units 26A, 26B. The AAL1 protocol is implemented at CBR/ATM interface units 26A, 26B. It should be understood that only two nodes 23A, 23B are shown for illustrative purpose, but that a far greater number of nodes can be used with each node having associated CBR Tx/Rx units 24 and interfaces 26.

During transmission, a CBR/ATM interface unit 26 serves to packetize the constant bit rate (CBR) signal generated by its paired CBR Tx/Rx 24 into ATM cells according to the AAL1 protocol define by ITU-T Recommendation I.363.1. This involves the encoding in each ATM cell of certain cell AAL1 protocol information, including a three bit sequence count (SC) and a protection code for preserving it from bit errors that may occur during the cell transfer. Upon reception, a CBR/ATM interface unit 26 depacketizes the asynchronously received ATM cells for reassembling the constant bit rate signal destined for its paired transmitter/ receiver 24. In the depacketizing process, CBR/ATM interface unit 26 checks uses the AAL1 protocol information processed in accordance with the SAR sublayer specifications for deducing whether cells have been lost or misinserted.

Figure 2:
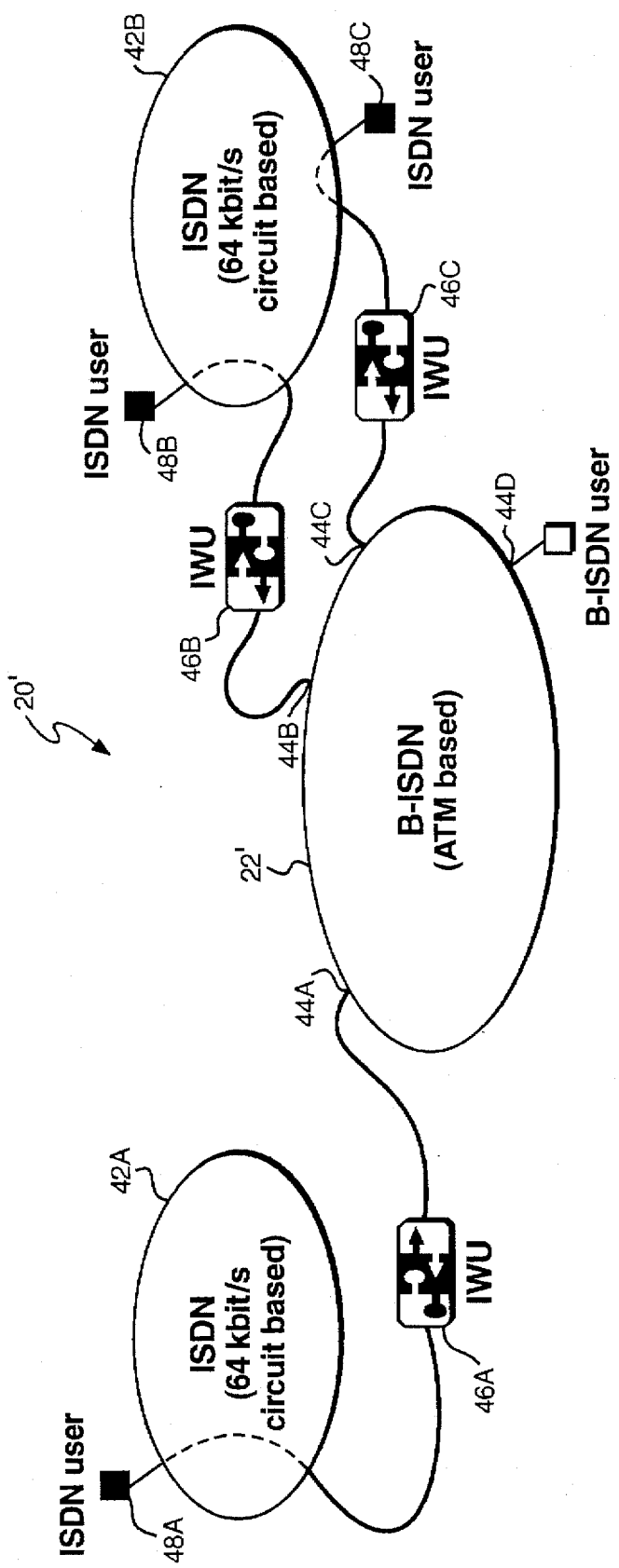
FIG. 2 is a schematic view of a telecommunications system including a B-ISDN network that is connected with ISDN networks by means of InterWorking units (IWUs) in which the AAL1 protocol is implemented.

FIG. 2 shows a telecommunications system 20' featuring a B-ISDN network 22' based on ATM technology. FIG. 2 further shows that B-ISDN network 22' is connected to a first ISDN network 42A (based on 64 kbit/sec circuits) at network node 44A and to a second ISDN network 42B at network nodes 44B and 44C. The connection of ISDN networks 42A and 42B to B-ISDN at nodes 44A–44C is accomplished using interface devices known as InterWorking Units (IWUs) in which the AAL1 protocol is implemented, specifically IWUs 46A–46C, respectively. A B-ISDN user is directly connected to B-ISDN network 22' at node 44D. ISDN user 48A is connected to ISDN network 42A; ISDN users 48B and 48C are connected to ISDN network 42B. In telecommunications system 20', the IWUs 46 perform the packetizing of CBR signals into ATM cells upon transmission, and upon reception perform the depacketizing and cell loss/misinsertion monitoring.

Figure 3:
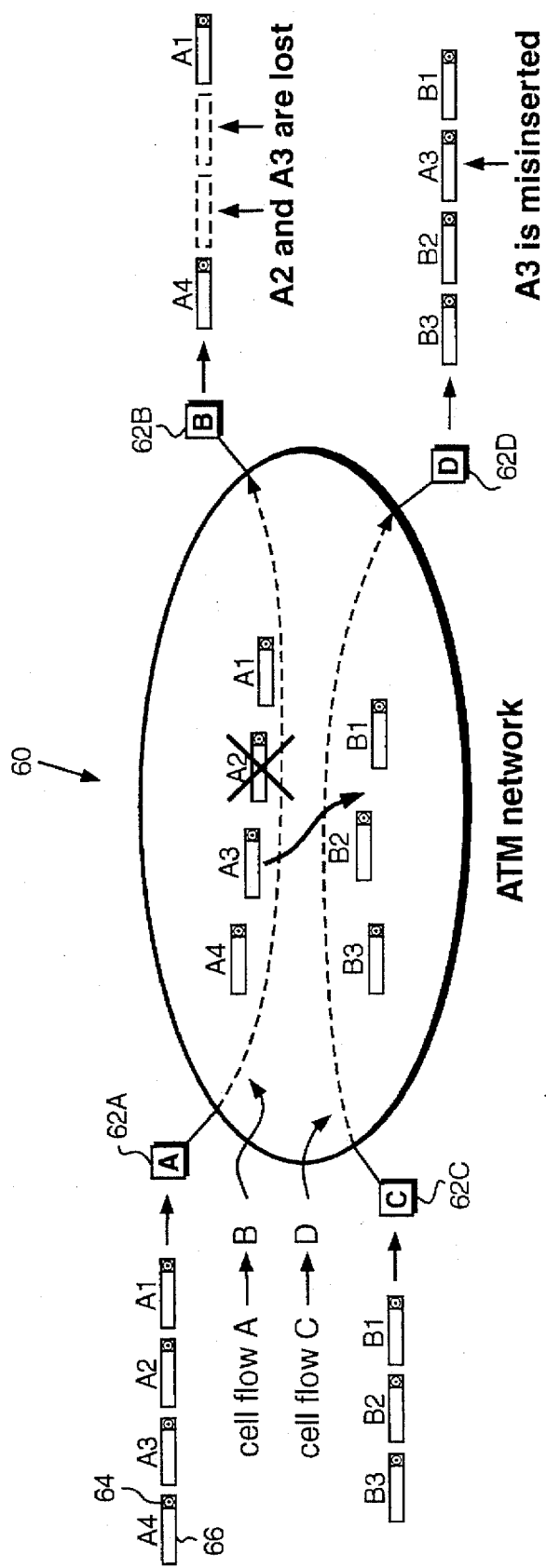
FIG. 3 is a schematic diagram depicting transfer, loss, and misinsertion of cells in an ATM network.

FIG. 3 schematically depicts both cell loss and cell misinsertion in the context of an illustrative ATM network 60 having nodes 62A–62D. ATM cells arriving at network node 62A are denoted as cells A1, A2, ... A4 and are shown as intended for transmission to node 62B. Similarly, ATM cells arriving at network node 62C are denoted as cells B1, B2, B3, and are shown as intended for transmission to node 62D. As illustrated with respect to cell A4, each cell includes a cell header portion 64 (where address values identifying the ATM connection which the cell belongs to are encoded) and payload octets 66. ATM cells in which segments of CBR signals are packetized according to the AAL1 protocol include some AAL1 protocol information in the first part of their payload, the remaining part being reserved for the transport of user data (segments of the CBR signal).

While the cells A1, A2, ... A4 are intended for transmission to node 62B, it can be seen from FIG. 3 that cell A3 does not follow an appropriate cell flow path through network 60 and becomes inserted into the cell flow between nodes 62C and 62D, and upon reception at node 62D is considered a "misinserted" cell. Cell A2, on the other hand, is lost altogether in ATM network 60, with neither cells A2 nor A3 reaching node 62B and thus being considered "lost" cells.

Figure 4:
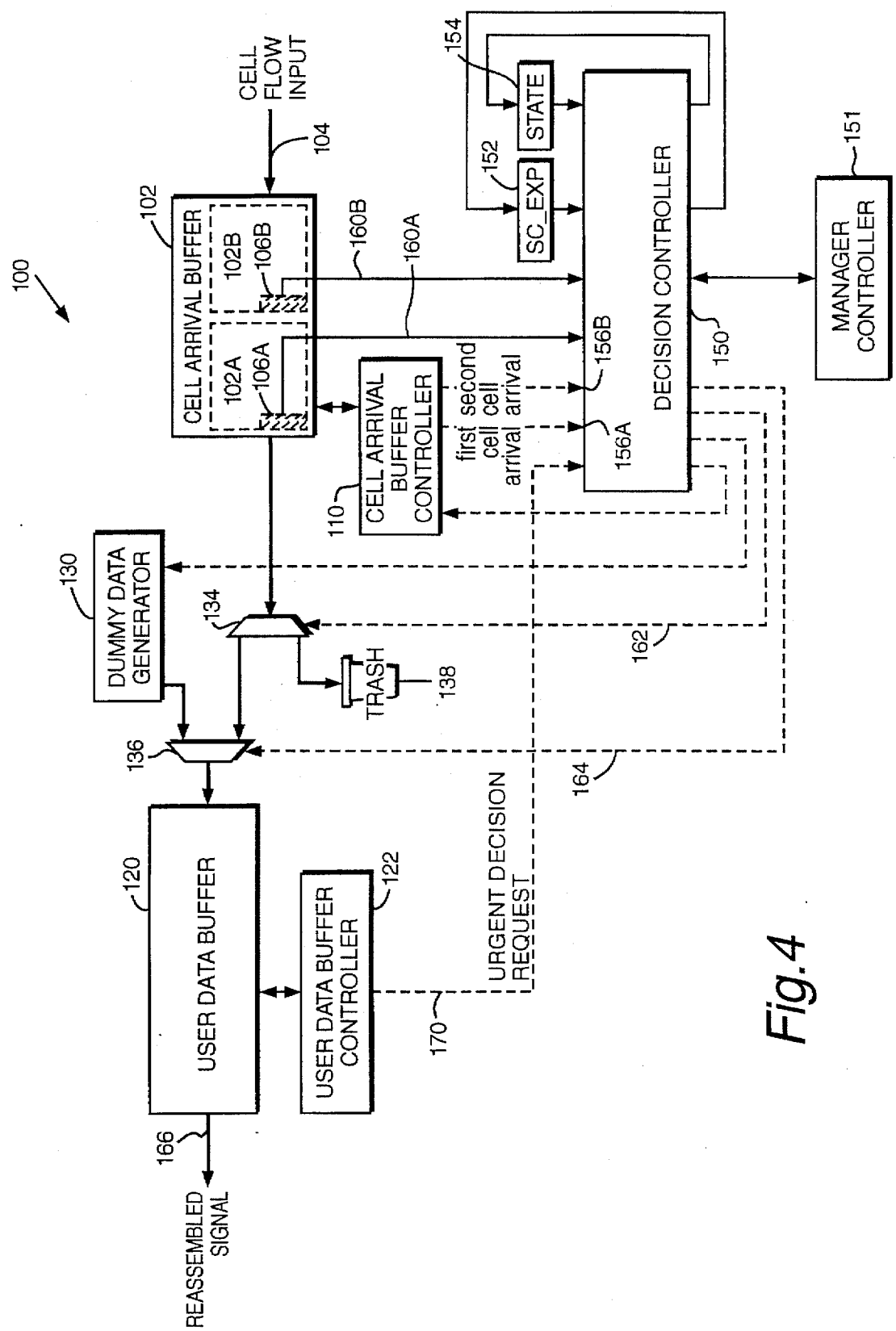
FIG. 4 is a schematic view of an ATM cell arrival monitoring system according to an embodiment of the invention.

FIG. 4 shows an ATM cell arrival monitoring system 100 utilizable in receiver portions of such devices as IWUs 46 of FIG. 2 or interfaces 26 of FIG. 1. Monitoring system 100 includes cell arrival buffer 102 connected to receive incoming ATM cells on cell flow input line 104. Cell arrival buffer 102 has two registers 102A, 102B for storing two arriving ATM cells. The AAL1 protocol information of the arriving ATM cells as processed by the SAR sublayer is specifically stored in memory locations 106A, and 106B, respectively, of registers 102A, 102B. Transfer operations cells into, through, and out of cell arrival buffer 102 are controlled by cell arrival buffer (CAB) controller 110.

In some cases, if not most cases, it may be that the entire ATM cell need not be loaded into register 102A or register 102B of cell arrival buffer 102, but merely the user data included in the cell and the AAL1 protocol information to be processed by the Convergence Sublayer (as specified in ITU-T Rec. I.363.1). Such amount can be, for example, the four bit SN field (including the three bit sequence count [SC] value) appropriately corrected when needed and possibly, a one bit "SN validity check" flag reporting the validity of the SN field as declared in consequence of the error checking/correcting operations performed by SAR sublayer and the 47 octets corresponding to the last part of the cell payload. Although the contents of registers 102A and 102B are often referred to herein as "cells", it should be understood that the contents of the cell arrival buffer need be only so much information as is required to make the acceptance decisions described herein for determining whether to route the user data in those registers to user data buffer 120. At some junctures herein, the contents of register 102A and 102B are alternatively referred to as "SAR sublayer primitives" or simply "primitives".

Cell arrival monitoring system 100 also includes a user data buffer 120 with an associated user data buffer (UDB) controller 122; a dummy data generator 130; gates or multiplexers 134, 136; a "trash" register 138; and, a decision controller 150. Decision controller 150 reports to and is supervised by a manager controller 151. Connected to decision controller 150 are two updatable status registers, specifically a "SC_exp" register 152 and a "state" register 154.

Decision controller 150 ultimately decides, in the manner subsequently described, whether the user data conveyed by an arrived cell in cell arrival buffer 102 is routed to user data buffer 120 or to trash register 138. Decision controller 150 also decides whether dummy data from dummy data generator 130 is loaded into user data buffer 120, e.g., in lieu of user data from an expected ATM cell.

To facilitate the decisions summarized above, decision controller 150 is connected to various components of monitoring system 100. Upon arrival of a first ATM cell in cell arrival buffer 102 (which is loaded into register 102A), CAB controller 110 issues an interrupt on line 156A to decision controller 150. Likewise, upon arrival of a second ATM cell in buffer 102, CAB controller 110 issues an interrupt on line 156A to decision controller 150. Upon the respective interrupts on lines 156A and 156B, decision controller 150 accesses the contents of cell header memory locations 106A and 106B and obtains the three bit sequence count [SC] and the one bit SN validity check flag values therefrom on lines 160A and 160B, respectively.

When a decision is made by decision controller 150 whether to accept an ATM cell in register 102A, decision controller 150 sends a gate control signal on line 162 to control operation of gate 134. Since an input terminal of gate 134 is connected to an output terminal of register 102A, a first value of the gate control signal on line 162 causes gate 134 to route data contents of the ATM cell in register 102A to gate 136. A second value the gate control signal on line 162 causes gate 134 to route data contents of the ATM cell in register 102A to trash register 138.

In order to route data contents of an accepted ATM cell into user data buffer 120, decision controller 150 issues a gate control signal on line 164 to control gate 136. A first value of the gate control signal on line 164 causes gate 136 to route the user data from the accepted ATM cell into user data buffer 102. A second value of the gate control signal on line 164 causes gate 136 to route dummy data generated by dummy data generator 130 into user data buffer 120.

Operation of user data buffer 120 is controlled by UDB controller 122. In particular, admission of user data into buffer 120, shifting of user data through buffer 120, and playing out of user data from buffer 120 (onto line 166 as a reassembled CBR signal) is supervised by UDB controller 122. In addition, UDB controller 122 monitors conditions of user data buffer 120. In the event that user data buffer 120 reaches or experiences a predetermined condition, UDB controller 122 issues an "urgent decision request" interrupt on line 170 to decision controller 150. One example of such a predetermined condition is an amount of user data in user data buffer 120 falling below a predetermined minimum threshold. Determination of the predetermination minimum threshold is based on the parameters of a given system, and considers whether emptying of user data buffer 120 is occurring at such a fast rate that reassembly of a user CBR signal would be unstable.

In addition to the connections described above, decision controller 150 is connected to output values to the "SC_exp" register 152 and the "state" register 154, so that those values can be utilized in connection with subsequent execution of decision controller 150.

Cell arrival buffer 102 of the present invention is a two cell-accommodating buffer and is used for temporary storage of cells whose acceptance/rejection has yet to be decided. However, the cell decision acceptance/rejection scheme of the present invention is flexible.

In the above regard, the person skilled in the art should understand that FIG. 4 only shows part of the cell monitoring system essential for the support of the described cell arrival monitoring method, other parts not dependent on the method being omitted. Specifically the person skilled in the art should understand that the omitted parts include the following three types of circuitry:

A first type of circuitry provides a clock signal at a frequency controlled by the difference (expressed, for example, in terms of amount of octets) between the user data buffer filling level and a filling level assumed as a reference. Such circuitry periodically receives such difference from the user data buffer controller and implements the "adaptive source clock frequency recovery method" as specified by ITU-T Recommendation I.1.363.1. The user data buffer controller has the capability of identifying such difference and periodically passes it to this first type of circuitry.

A second type of omitted circuitry provides a clock signal at a frequency controlled by a four bit RTS value. This circuitry is able to read from the cell arrival buffer 102 the CSI bit of every accepted cell with odd SC value and to use a sequence of CSI bitms to recover a sequence of four bits RTS values. This circuitry adopts a corrective action whenever dummy data is generated to replace an expected cell with an odd SC value. This second type of circuitry implements the "Synchronous Residual Time Stamp (SRTS) Method" as specified in ITU-T Recommendation I.1.363.1.

A third type of circuitry is enabled when the "Structured Data Transfer Method" of the AAL1 protocol is used as specified in ITU-T Recommendation I.1.363.1 for mapping a group of n (with n>1) 64 kbit/second circuits in a single ATM connection. This third type of circuit is able to read from the cell arrival buffer 102 the eight bit pointer field of every accepted cell with even SC value and CSI bit set to one. This third type of circuit is able to maintain an expected pointer value on the basis of the amount of user data successively inserted into user data buffer 120. This third type of circuit also processes each eight bit pointer field acquired and compares the associated pointer value with the expected pointer value. Further, this third type of circuit operates corrective actions (e.g., dropping octets or adding dummy octets) on the user data conveyed by an accepted cell before it is moved into the user data buffer or to command the user data buffer controller to operate corrective actions on the user data buffer content when such pointer values are not equal. This third type of circuit also operates corrective actions when dummy user data is generated for replacing a cell which was expected to convey a pointer value.

Prior to a detailed discussion of the operation of the present invention, an overview is provided (with parenthetical reference to step numbers associated with subsequently detailed actions) followed by a brief glossary of terms.

The reception of a first cell (in register 102A) prompts decision controller 150 to make a decision on the first cell itself. The first cell is either accepted and used to feed user data buffer 120 (see e.g., step 5-8 of FIG. 5), or the first cell is kept in cell arrival buffer 102 and the corresponding decision postponed (see e.g., steps 5-7 through 5-11 of FIG. 5).

The reception of a second cell (in register 102B) prompts decision controller 150 to make a decision regarding acceptance of both the first and the second cell. Decision controller 150 can reach one of four possible decision results. As a first decision result, both the first cell and the second cell are accepted for feeding user data buffer 120 (see e.g. steps 5C-6 through 5C-8 of FIG. 5C). As a second decision result, the first cell is discarded while the second cell is accepted and used to feed user data buffer 120 (see e.g.,steps 5D-2 through 5D-4 of FIG. 5D). As a third decision result, dummy data corresponding to a specific number of cells is inserted into user data buffer 120, followed by acceptance of both tile first cell and the second cell into user data buffer 120 (see e.g. steps 5D-12 through 5D-15 of FIG. 5D). As a fourth decision result, a restart operation is preformed because it is not possible to identify and solve the defective condition encountered.

In accordance with the present invention, UDB controller 122 associated with user data buffer 120 is required to generate an urgent decision request interrupt whenever the amount of user data contained in buffer 120 gets lower than a predetermined threshold value. Thus, in the present invention, UDB controller 122 is not required to handle underflow events, since underflow events are prevented by the urgent decision request interrupt.

Figure 5:
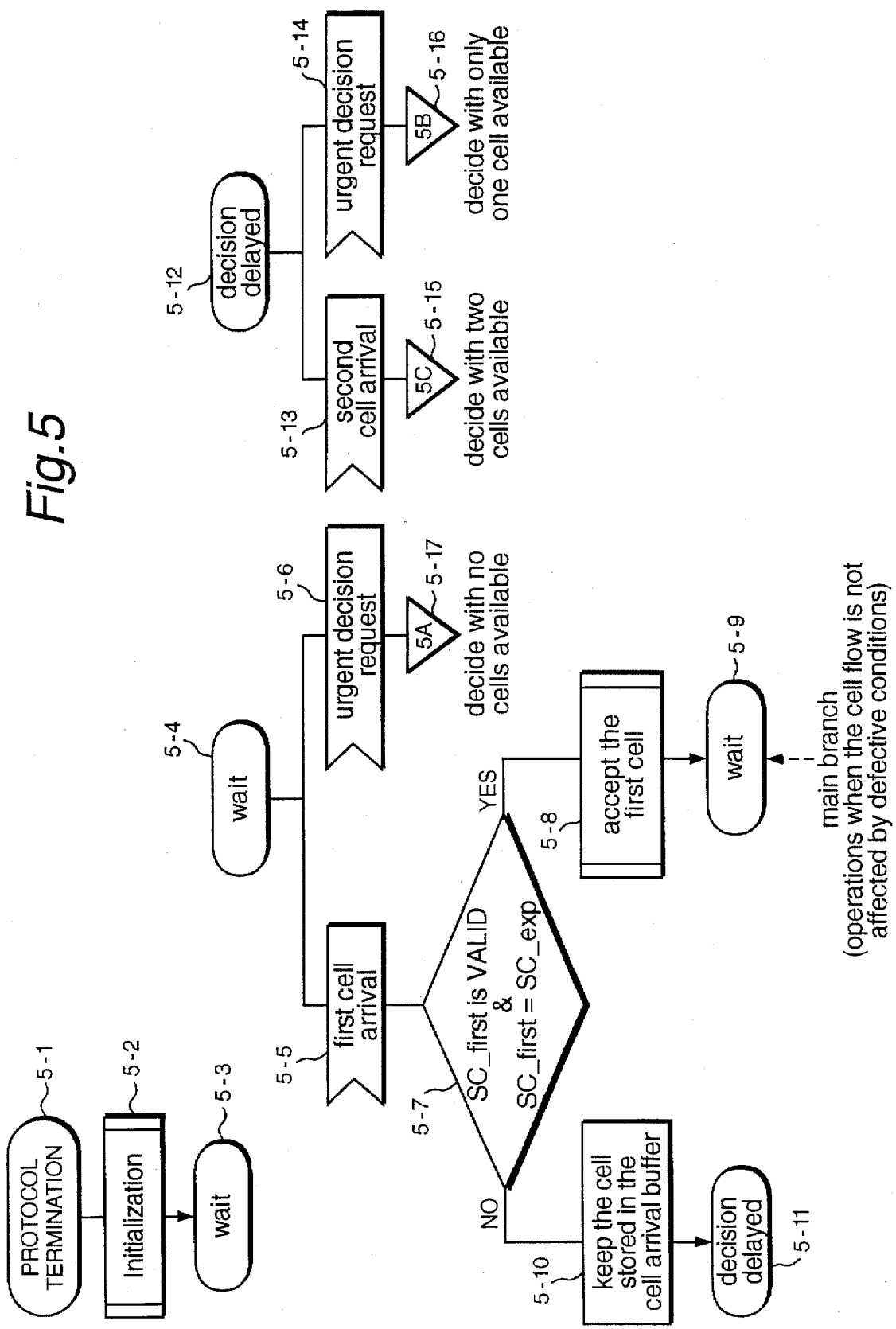
FIGS. 5, 5A, 5B, 5C, and 5D are specification and description language (SDL) diagrams showing steps executed by the ATM cell arrival monitoring system of FIG. 4.

An urgent decision request interrupt can be generated (1) when the system is in a delayed decision mode and has only a first cell in cell arrival buffer 102 (see e.g., step 5-14 of FIG. 5), or (2) when the system is in a wait mode with no cells in buffer 102 (see e.g., step 5-6 of FIG. 5).

Figure 5A:
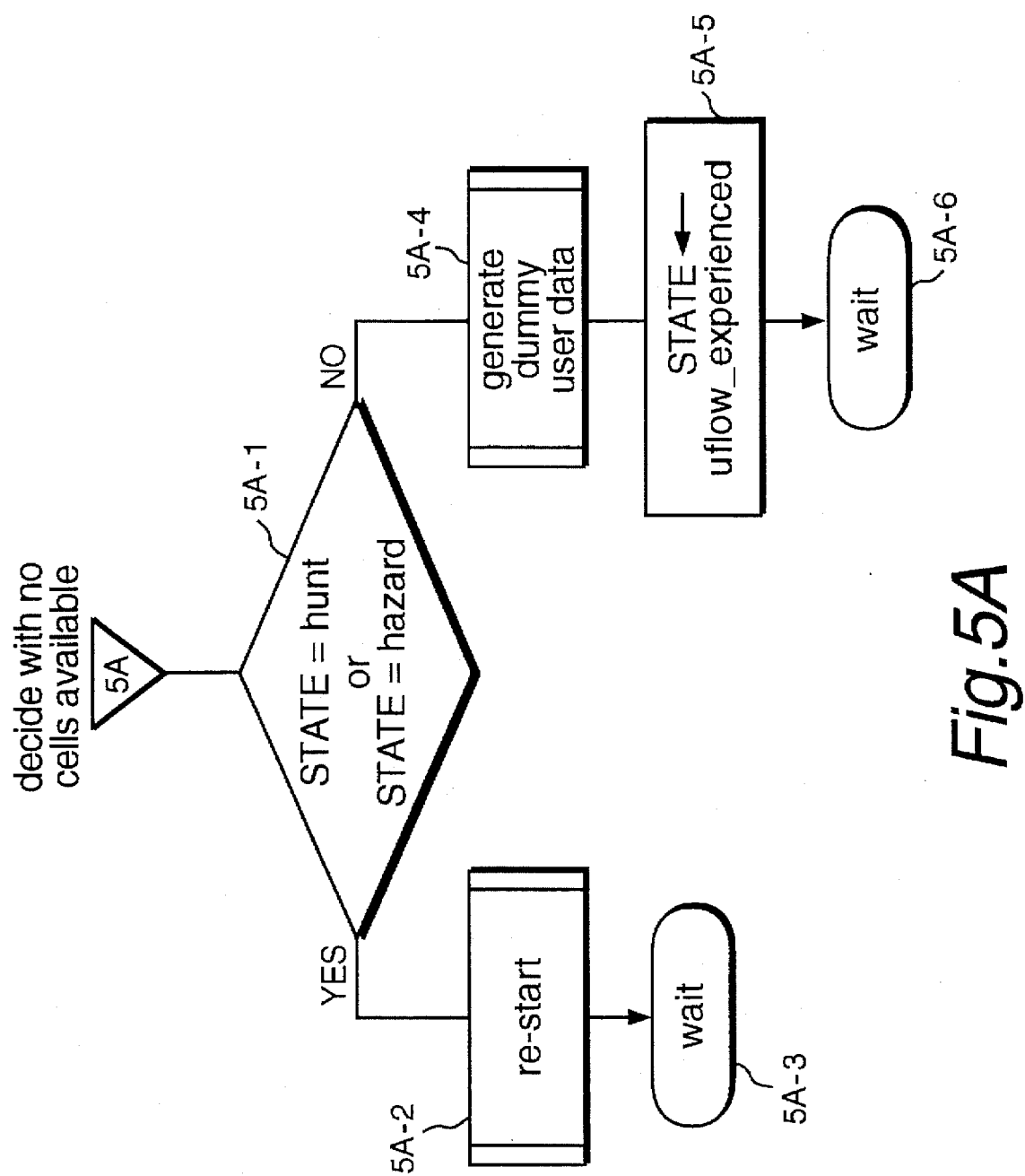
Figure 5B:
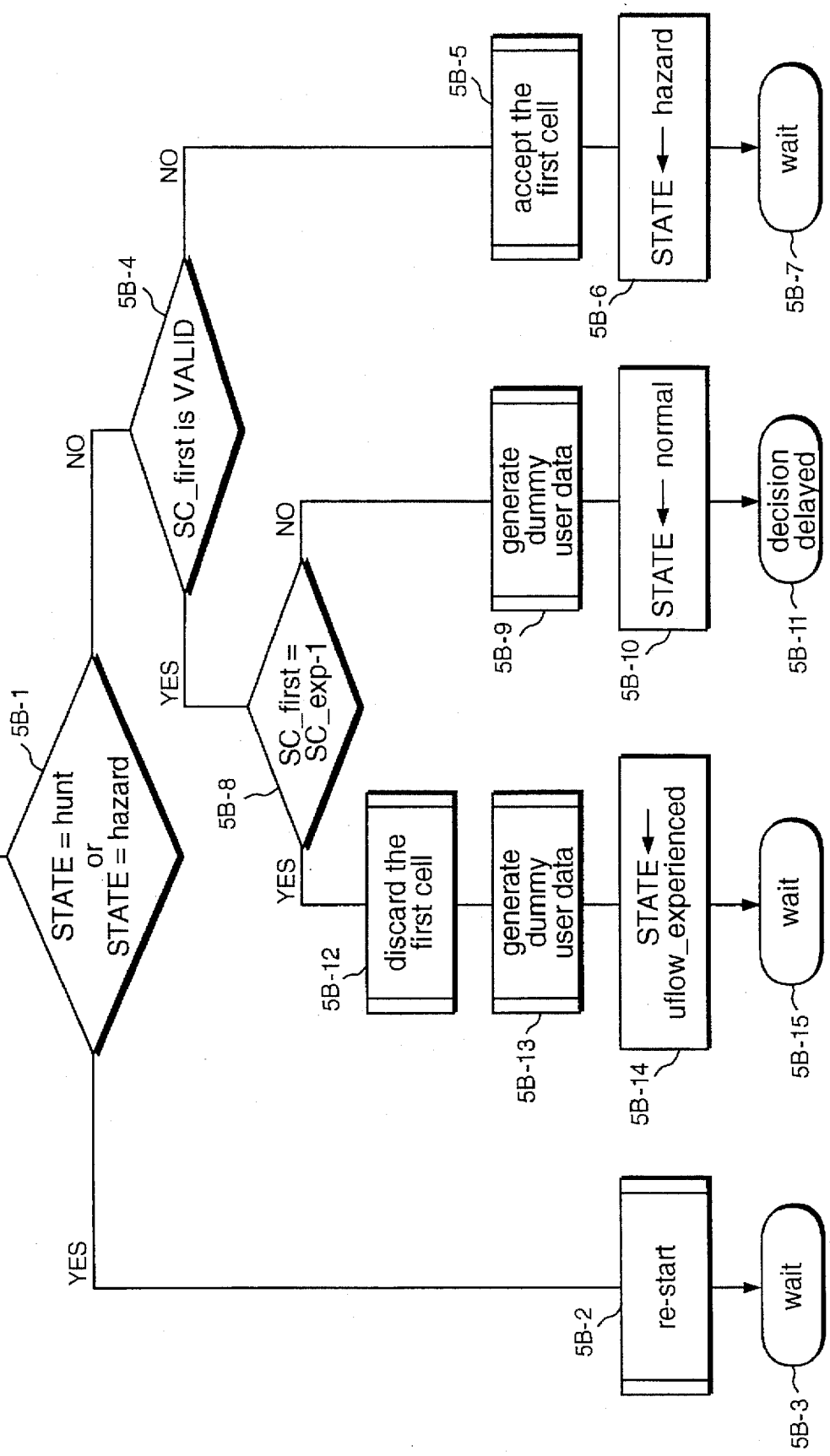

Reception of an urgent decision request interrupt when a first cell is available (in register 102A) triggers decision controller 150 to make a decision regarding the first cell and to take one of four possible actions (all of which are illustrated in FIG. 5B). As a first action, the first cell is accepted and used to fed user data buffer 120 (see e.g., steps 5B-5 of FIG. 5B). As a second action, the first cell is discarded and a dummy cell is generated to feed user data buffer 120 (see e.g., steps 5B-12 through 5B-14 of FIG. 5B). As a third action, dummy data is generated to feed buffer 120 and the first cell is kept in cell arrival buffer 102 and the decision regarding the first cell is postponed again (see e.g., steps 5B-9 through 5B-11 of FIG. 5B). As a fourth action, a restart procedure is performed because it is not possible to identify the solve the defective condition (see step 5B-2 of FIG. 5B).

Reception of an urgent decision request when no cells are in cell arrival buffer 102 triggers decision controller 150 to make a decision as to how to deal with the incipient buffer underflow condition in user data buffer 120. To deal with such incipient condition, decision controller 150 takes one of two possible actions (illustrated in FIG. 5A). As a first action, dummy data is generated to feed user data buffer 120 (see e.g., step 5A-4 of FIG. 5A). As a second action, a restart procedure is performed (see e.g., step 5A-2 of FIG. 5A).

In the present invention, when two cells are available in cell arrival buffer 102, a decision is made for both cells. In such case, cell arrival buffer 102 is emptied.

A brief glossary of terms ensues:

| | |
|---|---|
| SC_exp | is used herein to denote an expected sequence count value, i.e, the sequence count in sequence with the last accepted sequence. SC_exp is incremented modulo eight whenever a cell is accepted or replaced by generating dummy user data. In this way, SC_exp keeps significance also after defective conditions. |

-continued

| | |
|---|---|
| SC_first | is the sequence count value of the cell in register 102A whose acceptance/rejection is currently under decision. |
| SC_second | is the sequence count value of the cell that has been awaited in order to make a decision with two cells available. In other words, when a decision is made with two cells available, SC_first is the sequence count of the primitive in register 102A and SC_second is the sequence count of the primitive in register 102B. |
| STATE | is a variable or set of flags used to keep track of the last decision, when such decision must be checked at reception of a subsequent cell. The value of STATE is stored in status register 154. |

STATE can assume the following values:

| | |
|---|---|
| NORMAL | This is the state value used when there is no need to keep track of the last decision. |
| UNFLOW_EXPERIENCED | This value is used to keep track that dummy user data has been generated to satisfy an urgent decision request. At the subsequent decision, the UNFLOW_EXPERIENCED state is taken into account to identify defective conditions due to insufficient CDV compensation. |
| HAZARD | This value is used to keep track that the user data conveyed by a cell with invalid sequence count has been accepted to satisfy an urgent decision request interrupt. At the subsequent decision, either the HAZARD state is solved or the connection re-started. The HAZARD state is solved if the assumption that the cell with invalid sequence count was really the expected one is confirmed or if this assumption is recognized as incorrect but it is possible immediately to compensate therefor. |
| HUNT | This value is used during the initialization procedure. When in the HUNT state, all the defective conditions that cannot be definitely and immediately identified and solved result in the connection restart. This high sensibility to defective conditions can be used to guarantee that the connection is established only in absence of errors. |

FIGS. 5, 5A, 5B, 5C, and 5D are specification and description language (SDL) diagrams showing steps executed by the cell arrival monitoring system of FIG. 4. SDL diagrams are used as defined in ITU-T Recommendation Z.100.

A beginning of execution of decision controller 150 is indicated by step 5-1, which is followed by certain initialization operations shown as step 5-2. Initialization involves the insertion into the user data buffer of an amount of dummy data corresponding to an initial delay selected on the basis of the expected CDV, the setting of an initial state (e.g., the HUNT state), and the waiting for the arrival of an acceptable cell before starting the deblocking process. After initialization, decision controller 150 waits (as indicated by step 5-3 and step 5-4) until an interrupt is encountered.

Upon receiving an interrupt while no cells are stored in cell arrival buffer 102 (shown as step 5-4), decision controller 150 determines whether the interrupt occurred on line 156A (step 5-5), thereby indicating that a cell has been received and stored in register 102A of cell arrival buffer 102 or that an "urgent decision request" interrupt occurred on line 170 step 5-6).

Assuming a cell is received into register 102A of cell arrival buffer 102, CAB controller 110 generates an interrupt on line 156A to decision controller 150. Thereupon, decision controller 150 accesses register 106 to obtain both the sequence number validity flag and the sequence count value of the cell. If (at step 5-7) the sequence count value of the cell is recognized as valid on the basis of the sequence number validity flag and it is equal to the expected count number, at step 5-8 the cell is accepted. Acceptance of the cell involves decision controller 150 sending gate control signals on lines 162 and 164 to gates 134 and 136, respectively, so that a data portion of the accepted cell can be loaded into user data buffer 120. Decision controller 150 communicates with UDB controller 122 to effect the loading. Upon the loading of the user data conveyed by an accepted cell into user data buffer 120, decision controller 150 resumes its waiting for another interrupt (step 5-4 or step 5-9).

Supposing that the next interrupt at step 5-4 is for a cell (arriving in register 102A) which is not the next expected cell (i.e., its sequence count is out of sequence) or which has an invalid sequence count (identified on the basis of the sequence number validity flag), the determination at step 5-7 is negative, with the result that steps 5-10 and 5-11 are executed. At step 5-10, the received cell is retained in register 102A of cell arrival buffer 102 and (as indicated by step 5-11) a decision on such cell by decision controller 150 is delayed until a next interrupt (step 5-12).

In a delayed decision mode, register 102A stores a cell for which an acceptance decision has been delayed. When, in a delayed decision mode, decision controller 150 receives an interrupt (at step 5-12), decision controller 150 again determines whether the interrupt is based on arrival (in register 102B) of a second cell (an interrupt on line 160B, as indicated by step 5-13 or an urgent decision request (an interrupt on line 170, as indicated by step 5-14).

In the delayed decision mode, the fact of a cell arrival in register 102B means that decision controller 150 can make its decision regarding the cell stored in register 102A on the basis of two cells, i.e., the cell stored in register 102A and the newly arrived cell in register 102B. A cell arrival determination at step 5-13 means that decision controller 150 executes the steps shown in FIG. 5C (as indicated by symbol 5-15).

In the delayed decision mode, an urgent decision request (step 5-14) requires that decision controller 150 make its decision regarding the cell stored in register 102A with only one cell available, i.e., the cell in register 102A. Such one cell-based determination means that decision controller 150 executes the steps shown in FIG. 5B (as indicated by symbol 5-16).

Figure 5C:
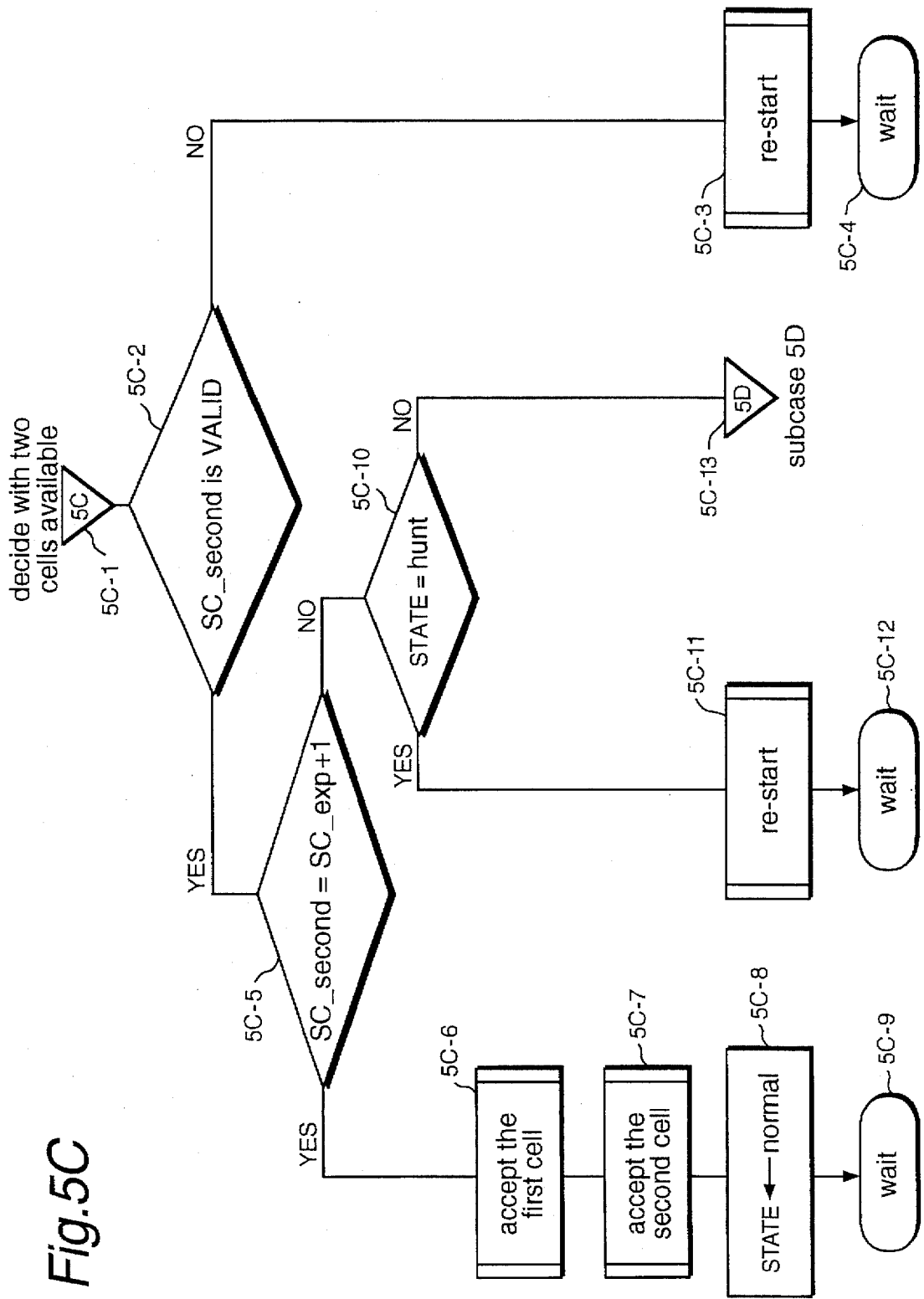

Assume that an interrupt at step 5-12 is due to arrival of a new cell in register 102B of cell arrival buffer 102. In such case, the steps of FIG. 5C are executed by decision controller 150, with decision controller 150 first beginning its two cell available analysis (step 5C-1) by examining the sequence number validity flag and the sequence count value of the second cell (stored in memory locations 106B and received on line 160B). At step 5C-2, decision controller 150 determines whether the SN validity check flag indicates that sequence count value of the cell in register 206B is valid. If not, at step 5C-3 decision controller 150 controller 150 initiates a restart procedure, which involves operations similar to those of the initialization procedure. In particular, during restart user data is dropped from the user data buffer or dummy data is inserted into it so that its contents becomes an amount of data corresponding to the selected initial delay; an initial state (e.g., the HUNT state) is set; and, an acceptable cell is awaited before resuming the deblocking process. After the restart procedure decision controller 150 enters a wait mode (as indicated by step 5C-4 or step 5-4).

Assuming the validity flag check at step 5C-2 is positive, at step 5C-5 decision controller 150 checks the sequence count of the cell in register 102B ("SC_second"). For the check of step 5C-5, decision controller 150 remembers what the sequence count of the cell in register 102A should have been (but was not), and determines whether the sequence count of the cell in register 102B sequentially follows the should-have-been sequence count for the cell in register 102A. The sequence count which sequentially follows the should-have-been sequence count for the cell in register 102A is depicted herein as SC_exp+1, the "+1" being only representative of the sequential ordering and not a mere incrementation by one, since the sequence numbers occur modulo 8.

if it were determined at step 5C-5 that the sequence count of the cell in register 102B is SC_exp+1, at step 5C-6 the contents of register 102A of cell arrival buffer 102 are gated into user data buffer 120. Then, at step 5C-7, the data from the cell in register 102B is gated into user data buffer 120. Decision controller 150 then sets its state to NORMAL (step 5C-8) prior to entering a wait mode (step 5C-9 or step 5-4) for the next interrupt.

If it were determined at step 5C-5 that the sequence count of the cell in register 102B is not SC_exp+1, at step 5C-10 decision controller 150 checks to determine whether its current state is the HUNT state. If the current state is HUNT, at step 5C-11 decision controller 150 conducts a restart operation (previously explained with reference to step 5C-3) before entering a wait mode (step 5C-12 or step 5-4). Should the current state not be the HUNT state, the steps of FIG. 5D are executed (as indicated by symbol 5C-13).

Figure 5D:
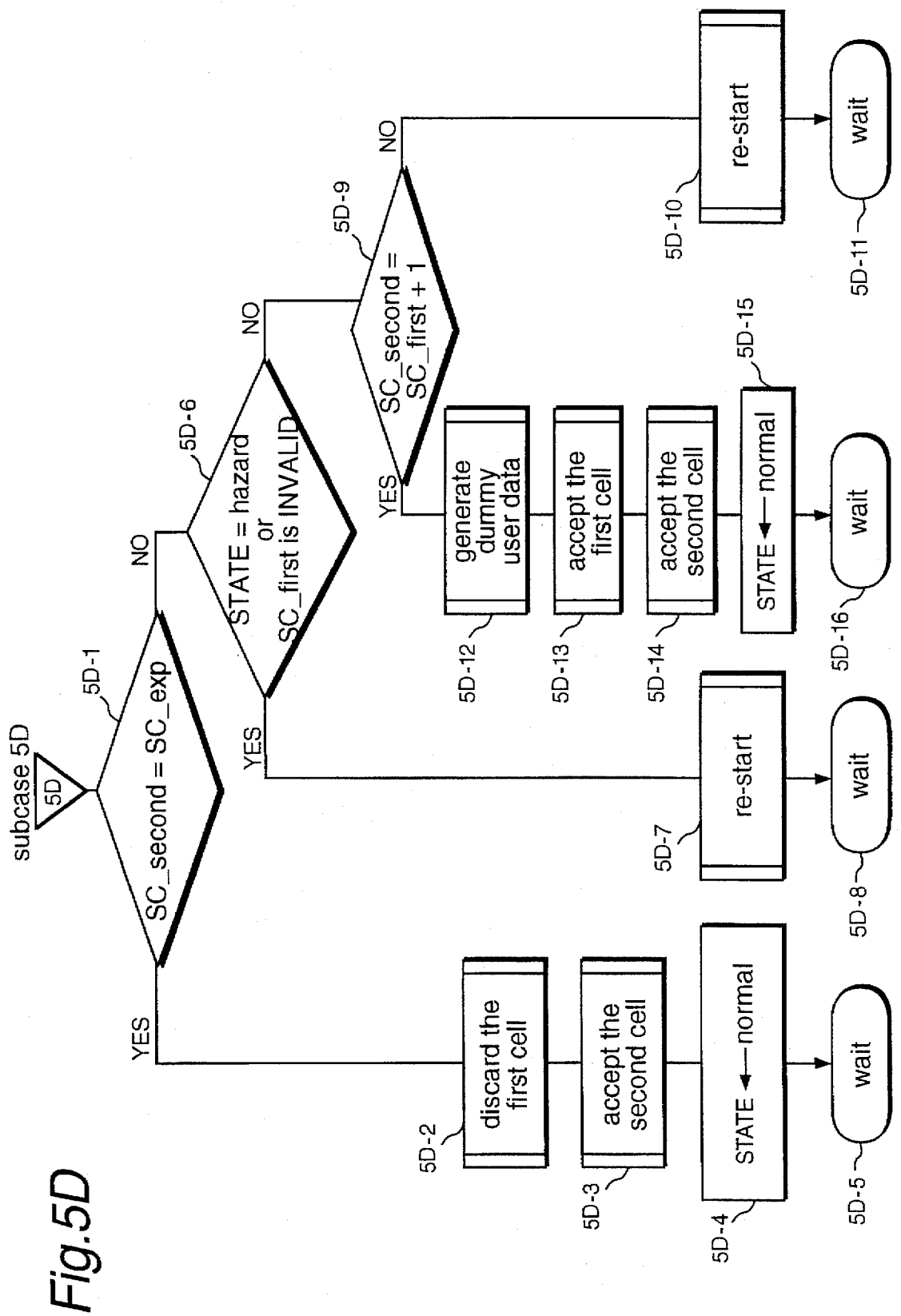

FIG. 5D depict steps executed when, not in the HUNT state, decision controller 150 determines that the sequence count of the cell in register 102B is not SC_exp+1. Such occurs when the cell in register 102A does not have the sequence count which it is expected to have or it has an invalid sequence count, and the cell in register 102B has a valid sequence count but does not have the sequence count which follows the expected sequence count. At step 5D-1, decision controller 150 determines whether the sequence count of the cell in the cell in register 102B ("SC_second") has the sequence count which was expected for the cell in register 102A ("SC_exp"). If the determination in step 5D-1 is affirmative, decision controller 150 knows that the cell that the cell in register 102A is incorrectly inserted between two cells having sequential sequence numbers. Accordingly, at step 5D-2 decision controller 150 gates the data from register 102A into trash register 138. Then, at step 5D-3, decision controller 150 accepts the cell in register 102B by gating the user data of such cell via gates 134 and 136 into user data buffer 120. Decision controller 150 then sets its state to NORMAL (step 5D-4), and then enters a wait mode (step 5D-5 or step 5-4).

At step 5D-1, decision controller 150 determines whether the sequence count of the cell in register 102B ("SC_second") is the sequence count which was expected for the cell in register 102A ("SC_exp"). If the determination in step 5D-1 is negative (i.e., if the cell in the cell in register 102B does not have the sequence count which was expected for the cell in register 102A ["SC_exp"]), decision controller 150 makes two checks at step 5D-6. First, decision controller 150 checks whether its state is the HAZARD state. Secondly, decision controller 150 checks whether the SN validity check flag of the cell in register 102A is invalid. If either check is affirmative, a restart operation occurs (step 5D-7) followed by entry into the wait mode (step 5D-8 or step 5-4). If both checks of step 5D-6 are negative, decision controller 150 checks at step 5D-9 whether the sequence count of the cell in register 102B (SC_second) sequentially follows the sequence count of the cell in register 102A (SC_first). In other words, even though the cell in register 102A does not have the expected sequence count, a determination is made at step 5D-9 whether the sequence counts of the cells in registers 102A and 102B are in sequence with one another. If the check at step 5D-9 is negative, decision controller 150 conducts a restart operation (at step 5D-10) before entering a wait mode (step 5D-11 or step 5-4).

If the sequence counts of the cells in registers 102A and 102B are in sequence with one another, although the sequence count of the cell in register 102A is not the expected sequence count, processing continues from step 5D-9 to step 5D-12. At step 5D-12, decision controller 150 causes dummy generator 130 to generate dummy data for all (one or more) cells which were expected before receipt of the cell in register 102A, and to gate the dummy data into user data buffer 120. Then, at step 5D-13, the user data of the cell in register 102A is gated into user data buffer 120, followed by the user data of the cell in register 102B (step 5D-14). Decision controller 150 then sets its state to the NORMAL state (step 5D-15) prior to entering a wait mode (step 5D-16 or step 5-4).

The foregoing discussion dealt with a delayed decision which was ultimately culminated by receipt of another cell into cell arrival register 102. As indicated in FIG. 5, particularly steps 5-14 and 5-16, decision delay can also be terminated by an urgent decision request received on line 170 from UDB controller 122. An urgent decision request interrupt is generated by UDB controller 122 when a predetermined condition occurs in user data buffer 120, such as an emptying of user data buffer 120 to a point that reassembly of a user signal would be unstable Steps executed by decision controller 150 upon receipt of an urgent decision request interrupt are shown in FIG. 5B.

The steps of FIG. 5B involve making an acceptance decision regarding an out-of-sequence or invalid cell in register 102A when an urgent decision request interrupt from UDB controller 122 terminates a delayed decision mode. At step 5B-1, decision controller 150 checks whether its current state is either the HUNT state or the HAZARD state. If the current state is either the HUNT state or the HAZARD state, decision controller 150 performs a restart operation (step 5B-2) prior to entering the wait mode (step 5B-3 or step 5-4). If the current state is other than the HUNT state or the HAZARD state, at step 5B-4 decision controller 150 checks whether the sequence count for the cell in register 102A ("SC_first") is valid. 3If the check at step 5B-4 is negative, decision controller 150 gates to user data buffer 120 the user data from the cell in register 102A (step 5B-5). Then, at step 5B-6, decision controller 150 puts itself into the HAZARD state prior to entering the wait mode (step 5B-7 or step 5-4).

If it turns out that the sequence count of the cell in register 102A is valid upon an urgent decision request interrupt, decision controller 150 checks at step 5B-8 whether the sequence count value of the cell in register 102A (SC_first), not being the expected sequence count value, is the sequence count value immediately preceding the expected sequence count value (i.e., SC_exp−1). If not, decision controller 150 instructs dummy data generator 130 to generate dummy user data to satisfy the need of user data buffer 120 for one cell (step 5B-9). Then, decision controller 150 puts itself in the NORMAL state (step 5B-10) and remains in the delayed decision mode (indicated by step 5B-11 or step 5-12). In the delayed decision mode, decision controller 150 awaits (at step 5-12) an interrupt, which could be either a cell arrival interrupt or another urgent decision request interrupt. If the interrupt at step 5-12 turns out to be a cell arrival interrupt, decision controller 150 will then have the benefit of a further cell in register 102B in order to make a decision regarding acceptance of the cell in register 102A (following the steps of FIG. 5C). If the interrupt at step 5-12 is an urgent decision request interrupt, the steps of FIG. 5B are repeated in order to make a decision with respect to the cell which still resides in register 102A of cell arrival register 102.

If it turns out, as a result of the check at step 5B-8, that the sequence count value of the cell in register 102A (SC_first) is the sequence count value immediately preceding the expected sequence count value (i.e., SC_exp−1), steps 5B-12 through 5B-15 are executed. At step 5B-12, the cell in register 102A is gated to trash register 138. Then, at step 5B-13, decision controller 150 causes dummy data generator 130 to generate dummy data which is gated to user data buffer 120 in place of the cell which was expected but not received in cell arrival buffer 102 at the time of the urgent decision request interrupt. In view of the fact that the user data buffer 120 has encountered an underflow condition (which prompted the urgent decision request interrupt), decision controller 150 sets itself to an UNFLOW_EXPERIENCED state (step 5B-14) prior to entering the wait mode (step 5B-15 or step 5-4).

It may occur that, when decision controller 150 is in its wait mode and no cells are in cell arrival buffer 102, the interrupt encountered at step 5-4 is an urgent decision request interrupt (step 5-6). An urgent decision request interrupt indicates that the amount of user data in user data buffer 120 has fallen below a predetermined threshold necessary for playing out of user data to maintain a stable constant bit rate signal. In such case, the steps of FIG. 5A are executed as indicated by symbol 5-17 of FIG. 5.

When encountering an urgent decision request interrupt with no cells in cell arrival buffer 102, decision controller 150 first checks (at step 5A-1) whether it is currently in either the HUNT state or the HAZARD state. If the current state is either the HUNT state or the HAZARD state, decision controller 150 performs its restart operation (step 5A-2) and then enters the wait mode (step 5A-3 or step 5-4). If the current state is not the HUNT state or the HAZARD state, at step 5A-4 decision controller 150 causes dummy data generator 130 to generate dummy user data and for the dummy user data to be gated to user data buffer 120, thereby fulfilling the need of buffer 120 for data and replacing the non-arrived user data that should have been loaded into buffer 120 with the dummy data. Then, at step 5A-5, decision controller 150 puts itself in the UNFLOW_EXPERIENCED state and before going into the wait mode (step 5A-6 or step 5-4).

In the foregoing description, whenever a cell is to be discarded (i.e., gated into trash register 138) a special procedure (depicted by FIG. 5E) for distinguishing misinserted and lost cells is executed. Prior to discarding of a cell, decision controller 150 checks to determine if its current state is the UNFLOW_EXPERIENCED state (step 5E-1). If the determination at step 5E-1 is affirmative, decision controller 150 concludes that the cell to be discarded is a late arrival and prepares a diagnostic message indicative of late arrival to manager 151 (step 5E-2). If the determination at step 5E-1 is negative, decision controller 150 concludes that the cell to be discarded is a misinserted cell and prepares a diagnostic message (indicative of misinsertion to manager controller 151 (step 5E-3). After either step 5E-2 or 5E-3, decision controller 150 actually discards the cell by gating the cell to trash register 138 (step 5E-4).

Thus, as shown in FIG. 5E, a criterion is provided to distinguish cell losses from late arrivals due to insufficient CDV compensation. Specifically, wherever a stored cell whose acceptance/rejection had been delayed is to be discarded, the check of FIG. 5E is performed to verify whether it is a misinserted or a late arrived (previously replaced by generated dummy data) cell.

With respect to the check of FIG. 5E, the criterion that is applied can be summarized as follows. The UNFLOW_EXPERIENCED state is entered whenever an urgent decision request must be satisfied an no cells are available. At the decision time, it is impossible to identify whether the defective condition is due to cell losses or to an insufficient CDV compensation that has led towards the underflow of user data buffer 120. The cell that is subsequently received is considered to be late arrived if it is recognized as the one that has just been replaced. The circumstance that the previously expected cell has been replaced by generating dummy user data can be taken into account on the basis of the UNFLOW_EXPERIENCED state. Since consecutive cells can result in late arrivals, the UNFLOW_EXPERIENCED state is kept at the occurrence of the following sequence of events: (1) dummy user data is generated to replace an unavailable cell; (2) the replaced cell is received, recognized as the late arrived and discarded; and (3) dummy user data is generated again because no other cells are available.

Figure 8:
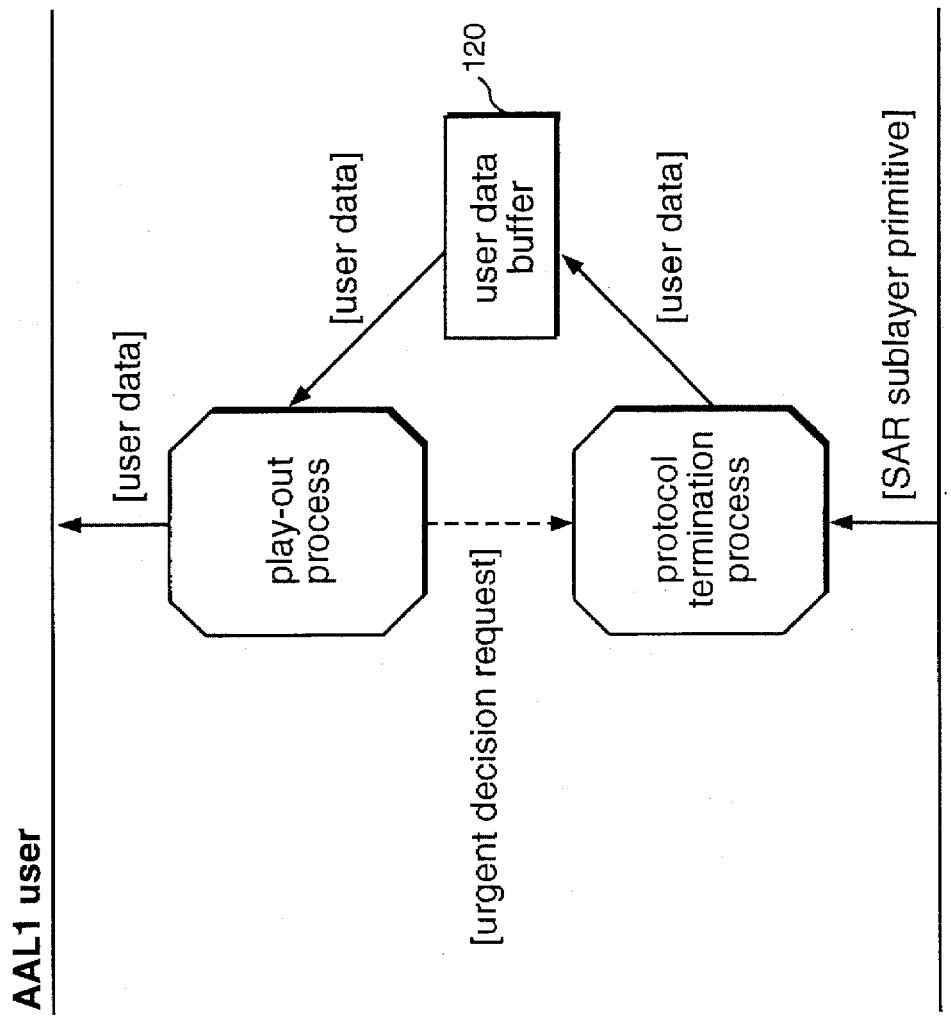
FIG. 8 is a diagrammatic view of processes executed in a receiving part of an AAL1 convergence sublayer, including a relationship between a protocol termination process and a play-out process.

Returning now to overall operation of the invention, the steps described above with reference to FIG. 5 and FIGS. 5A–5E can be viewed as being performed, for example, in two concurrent processes of a convergence sublayer of the receiving part of an AAL1 device. The two concurrent processes, known as the protocol termination process and the play-out process, both operate on user data buffer 120 (which is used to support CDV handling). As shown in FIG. 8, the protocol termination process is responsible for feeding user data buffer 120 while the play-out process is responsible for extracting the user data from buffer 120. The protocol termination process is triggered by reception of an SAR sublayer primitive and performs all the operations which are primitive oriented, including the detection and handling of defective conditions that may affect cell flow. The play-out process, on the other hand, is time triggered and performs all time controlled operations, including user data deblocking and delivery of data to the AAL1 user.

The play-out process generates the urgent decision request interrupt when the filing level of user data buffer 120 gets lower than a predetermined threshold value. The urgent decision request interrupt prevents buffer underflow conditions and supports an original strategy for detection of lost and misinserted cells. As explained before and now summarized, that original strategy is summarized by the following two rules: (1) immediately accept each SAR sublayer primitive ("cell") whose sequence count is valid and in sequence with the last cell; and (2) Try to postpone the decision on the acceptance/rejection of a SAR sublayer primitive if its sequence count is invalid or not in sequence with the last accepted primitive. The decision is taken at the reception of the subsequent primitive except in the case that an urgent decision request makes the corresponding delay impossible. The protocol termination process is basically driven by the occurrence of either (1) reception of a primitive from the SAR sublayer, or (2) reception of an urgent decision request from the play-out process.

The foregoing description of the structure of FIG. 4 and its operation (FIG. 5 and FIGS. 5A–5E) does not obscure the fact that the interface or interworking unit comprising cell arrival monitoring system can, in fact, handle a plurality of AAL1 connections. In this regard, an exemplary AAL1 device 600, as shown in FIG. 6, can have an ATM port 602 on one side which communicates through AAL1 device 600 with a plurality of constant bit rate (CBR) ports on the other side, two such CBR ports 604A and 6045 being shown in FIG. 6. AAL1 device 600 is flexibly configured to operate in either a first mode or a second mode.

In a first mode of operation of AAL1 device 600 of FIG. 6, the ATM signal received at port 602 is mapped to a single CBR signal connected at CBR port 604A. In the first mode, the path through AAL1 device 600 includes an AAL1 functions block 608A, with AAL1 functions block 608A in turn including the cell arrival monitoring system of the present convention as a subcomponent thereof. The first mode occurs, for example, in a situation in which the CBR port 604A is connected to T1 (1.544 Mbit/second) or E1 (2.048 Mbit/second) lines, and the T1 or E1 circuit is accessed simply as a 1.544 Mbit/second or 2.048 Mbit/second bit stream and mapped into a single ATM connection (unstructured transport).

In a second (alternative) mode of operation of AAL1 device 600 of FIG. 6, the ATM signal received at port 602 is used to output, on line 610 at CBR port 6045, a CBR signal which carries multiplexed channels by means of a frame structure. The CBR signal at port 6045 is thus composed of a plurality of lower bit rate signals that are multiplexed/demultiplexed in order to be mapped into different ATM connections. As shown in FIG. 6, each such channel is represented as having its own AAL1 functions block (e.g., blocks 608B–608k), with each AAL1 functions block including the cell arrival monitoring system of the present invention. The second mode is used, for example, when the CBR port 604B is connected to a T1/E1 line whose frame structure is considered in order to access the different 64 kbit/second circuits multiplexed into the line. Single or groups of 64 kbit/second circuits are regarded as 64 or n×64 kbit/second channels and mapped into separate ATM connections (structured transport).

When several AAL1 function blocks 608 are included in an AAL1 device 600 as shown in FIG. 6, arriving ATM cells are routed by router 612 (a multiplexer/demultiplexer) from port 602 to an appropriate one of the AAL1 function blocks 608 in accordance with examination of the VPI/VCI fields of the header of the ATM cell. Such routing is conventional, and can include address translation capabilities to compress the examined fields for recognition purposes, as is known to the person skilled in the art.

Typically, as illustrated above, core functions of AAL processing are supported by function blocks 608 replicated for each CBR interface. This is primarily due to the fact that the processing of the CBR signals sharing the same CBR interface has some dependencies that allow particular resources to be used in a sequential manner for different connections. However, it should further be understood that the blocks 608 can be implemented in varying manners. For example, blocks 608 can share some components.

Regardless of whether an AAL1 device 600 of FIG. 6 operates in the first or second of its aforediscussed modes, it should be readily understood that the principles of the present invention remain applicable.

As stated above, UDB controller 122 performs the control actions necessary in order to properly access user data buffer 120 (e.g., for storing, shifting, and extracting user data in/from buffer 120). Actual extraction of user data from user data buffer 120 can be accomplished with the aid of an unillustrated play-out controller which, in response to timing signals, requires UDB controller 122 to extract data from buffer 120 in order to send out the reassembled CBR signal according to the timing information. When the reassembled signal has to be inserted in a frame structure (so that it can share the CBR interface with other signals), the timing information includes frame information.

It should be understood that FIG. 4 only provides a schematic description of the principles of the invention, and that different schemes can represent embodiments of the same principles. Moreover, different implementations occur for differing embodiments of the whole scheme or of some of its parts. For example, the functions described in FIG. 4 as performed by hardware (sequential and combinatory logic implementing state machines and combinatory circuits) are instead performed in another embodiment by one or more microprocessors which execute microcode and operate on specific hardware parts. For example, AAL1 functions associated with all connections sharing the same CBR interface can be supported by a single RISC processor that sequentially operates on the memory areas and on hardware parts corresponding to each connection being handled. Both in a processor-based and fully hardware embodiment, the core function of decision controller 150 (i.e., the conversion of inputs including the current state and outputs including the new state and a set of control signals) can be implemented in numerous ways, such as pure combinatory logic or a memory look up table.

Figure 7:
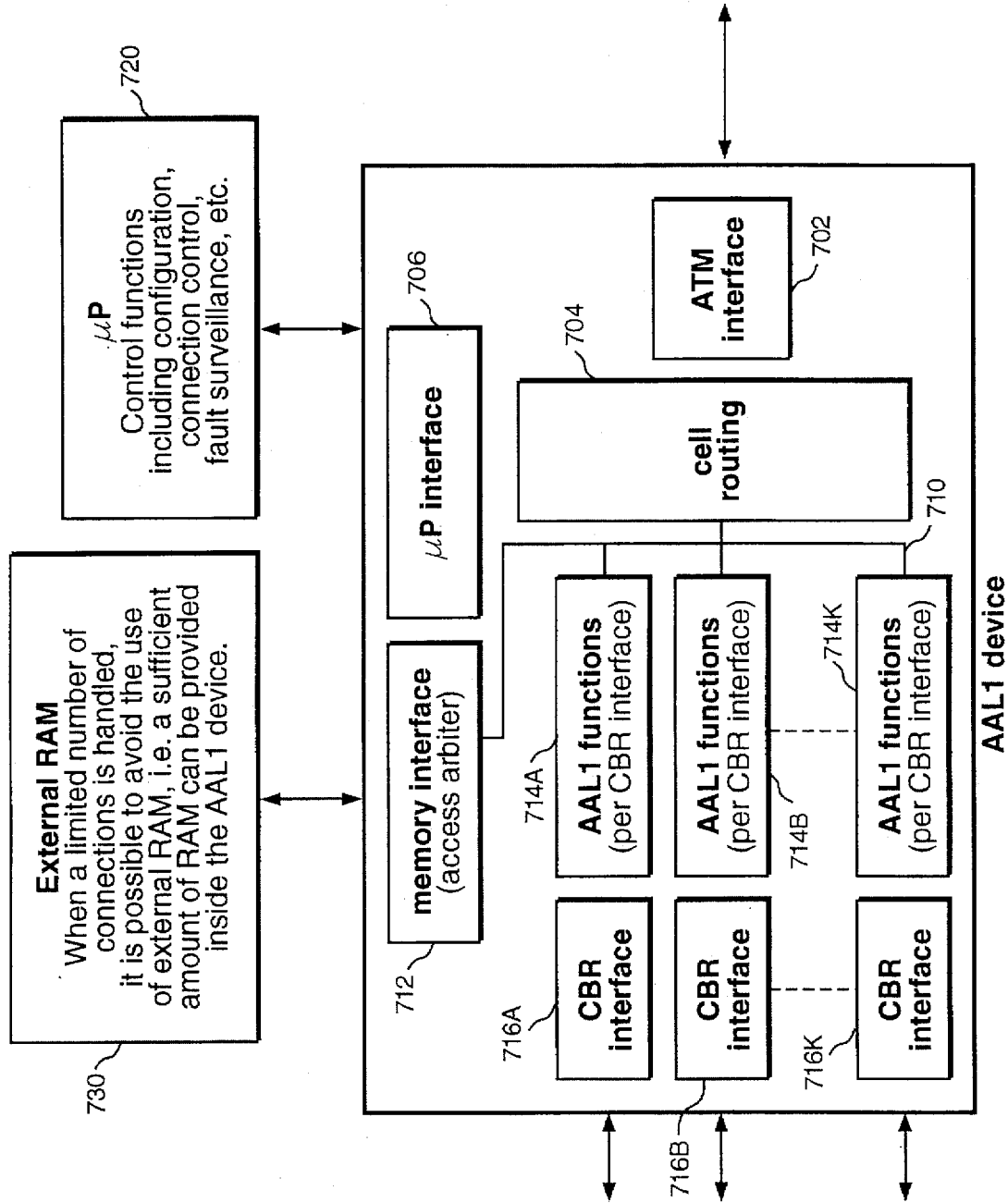
FIG. 7 is schematic view of an AAL1 device which utilizes a processor-based embodiment of the present invention and which further handles a plurality of CBR connections.

FIG. 7 shows a schematic example of structure of an AAL1 device 700 which further handles a plurality of CBR connections. The CBR connections are handled by means of AAL1 function blocks replicated for each CBR interface. Device 700 uses external RAM for data storage and is supported by a general purpose microprocessor acting as a manager controller for configuration and surveillance purposes. Device 700 includes an ATM interface 702; a cell routing block 704; a microprocessor interface 706; and, a bus 710 which connects cell routing block 704 to memory interface 712 and to a plurality of AAL1 functions blocks 714A–714k. The AAL1 functions blocks 714 perform the cell arrival monitoring functions above described, including the operations attributable in the FIG. 4 embodiment to decision controller 150. Each AAL1 functions block 714 is paired with a corresponding CBR interface 716.

Microprocessor interface 706 is connected to a manager microprocessor 720 which supervises, for example, configuration, connection control, and fault surveillance of AAL1 device 700. Memory interface 712 is connected to random access memory (RAM) 730. RAM 730 includes cell arrival buffers and user data buffers for each of the AAL1 processors. In general, the user data/buffer is implemented by means of a memory area addressed as a circular buffer, so that data is accessed as in a FIFO. The cell arrival buffer is a memory area where two cell positions are defined. The first cell position (e.g., register) and the second cell positions are defined by means of flags, so that it is possible to redefine a second cell as the new first cell simply by toggling the flag values. While RAM 730 is illustrated in FIG. 7 as being external RAM, it should be understood that memory can instead be provided in device 700. It should also be realized that different memory approaches can be utilized to optimize memory size and accesses.

Cell routing controller 704 performs numerous operations and tasks, including reading connection identifier information for each incoming ATM cell (e.g., the VPI/VCI fields of the header); verifying that the cell really belongs to one of the ATM connections being handled; and, storing the cell, or relevant portions of the cell, in the relevant position in the relevant cell arrival buffer.

The AAL1 function blocks 714, with resort to RAM 730, perform operations understood with reference to the steps described above in connection with FIG. 5 and FIGS. 5A–5E, including the urgent decision request determination. The urgent decision request determination, rather than being an interrupt, can be a flag that is set as a result of the user data buffer in RAM 730 falling to a predetermined emptying threshold.

The predetermined emptying threshold of user data buffer 120 can be ascertained by the person skilled in the art. User data buffer 120 compensates for cell delay variation. In so doing, a delay is introduced between the reception of a first primitive from the SAR sublayer after the connection establishment and delivery of the corresponding user data to the AAL1 user. The delay must be sufficient to absorb the maximum CDV that can affect the ATM cells conveying the CBR signal but cannot be arbitrarily large due to its impact on the end-to-end delay performance. Depending on the service bit rate, i.e. the bit rate of the transported CBR signal, a certain number of SAR sublayer primitives can be received during the initial delay. User data buffer 120 is employed to store the corresponding user data. The following examples illustrate the impact of the service bit rate on the number of SAR primitives that are expected to be received during the initial delay when it is assumed equal to 2 milliseconds: For a service bit rate of 2.048 Mbit/second, there is an ATM cell payload assembly delay (equivalent to the time interval between the transmission of two consecutive cells) of 183.6 microseconds, and the number of ATM cells that are expected to be received in 2 milliseconds is 10. For a service bit rate of 64 kbits/second, there is an ATM cell payload assembly delay of 5.9 milliseconds, so that no ATM cells are expected to be received in 2 milliseconds.

Thus, the present invention coordinates the detection of lost and misinserted cells with the occurrence of underflow conditions affecting the user data buffer (e.g., buffer 120) employed to support the handling of cell delay variation. The present invention implements detection criteria regardless of the service bit rate and delay sensitivity.

The present invention coordinates different decision criteria taking into consideration all possibly collectable information. The present invention unifies the handling of different services with different bit rates and delay sensitivity and provides reliable performance.

When an urgent decision request interrupt occurs and no primitives ("cells") are available, the urgent decision mechanism of the present invention is advantageously used also to provide a criterion to distinguish cell losses from late arrivals due to insufficient CDV compensation (see FIG. 5E).

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. A method of monitoring cell arrival in an asynchronous transfer mode (ATM) network, the method comprising:

(a) accepting a received cell if is recognized as the next expected cell;

(b) delaying an acceptance decision for the received cell if it is not recognized as the next expected cell until reception of a subsequent cell unless the acceptance decision is prompted by an underflow condition of a user data buffer; and (c) when the reception of the acceptance decision is prompted by the underflow condition of the user data buffer, using a sequence number of the received cell to determine if the received cell is to be discarded.

2. The method of claim 1, wherein the underflow condition of the user data buffer is an emptying of the user data buffer to a point that reassembly of a user signal would be unstable.

3. The method of claim 1, further comprising generating dummy data while delaying an acceptance decision for the received cell.

4. The method of claim 1, further comprising making the acceptance decision prompted by the underflow condition of a user data buffer by taking into account whether a cell whose acceptance decision has been delayed is present in the cell arrival buffer.

5. The method of claim 1, further comprising, upon making the acceptance decision prompted by the underflow condition of a user data buffer, making a determination regarding a cause for the user data buffer to reach the underflow condition.

6. The method of claim 1, further comprising, upon making the acceptance decision prompted by the underflow condition of a user data buffer, making a determination regarding whether cell losses or an insufficient cell delay variation (CDV) compensation causes the user data buffer to reach the underflow condition.

7. The method of claim 1, wherein when the acceptance decision is prompted, the sequence number of the received cell is utilized to determine whether one of the following occurs: (1) generating dummy data; (2) discarding the received cell and generating the dummy data.

8. A method of monitoring cell arrival in an asynchronous transfer mode (ATM) network, the method comprising:

accepting a received cell if is recognized as the next expected cell;

delaying an acceptance decision for the received cell if it is not recognized as the next expected cell until either reception of a subsequent cell or until the acceptance decision is prompted by a predetermined condition of a user data buffer;

wherein recognizing the received cell as the next expected cell involves verification that a sequence number of the received cell is in sequence with a last received cell and that a sequence number validity flag is of a predetermined value.

9. A method of monitoring cell arrival in an asynchronous transfer mode (ATM) network, the method comprising:

(a) accepting a received cell if is recognized as the next expected cell;

(b) delaying an acceptance decision for the received cell if it is not recognized as the next expected cell until either reception of a subsequent cell or until the acceptance decision is prompted by a predetermined condition of a user data buffer;

(c) upon the user data buffer reaching the predetermined condition, (1) loading dummy data into the user data buffer; and (2) analyzing a next received cell and considering the next received cell as a late arrived cell indicative of insufficient cell delay variation (CDV) compensation if it is recognized as being the cell that has just been replaced with the dummy data.

10. A method of monitoring cell arrival in an asynchronous transfer mode (ATM) network, the method comprising:
   (a) using a cell handling first criteria for attempting to recognize a received cell as a next expected cell; and
   (b) when a handling decision regarding the received cell is not feasible using the cell handling first criteria and when an underflow condition of a user data buffer is reached, using a cell handling second criteria for processing the received cell, the cell handling second criteria involving using a sequence number of the received cell to determine if the received cell is to be discarded.

11. The method of claim 10, wherein the underflow condition of the user data buffer is an emptying of the user data buffer to a point that reassembly of a user signal would be unstable.

12. The method of claim 10, further comprising generating dummy data while delaying a handling decision for the received cell.

13. The method of claim 10, further comprising making the handling decision prompted by the underflow condition of a user data buffer by taking into account whether a cell whose acceptance decision has been delayed is present in the cell arrival buffer.

14. The method of claim 10, further comprising, upon making the handling decision prompted by the underflow condition of a user data buffer, making a determination regarding a cause for the user data buffer to reach the underflow condition.

15. The method of claim 10, further comprising, upon making the handling decision prompted by the underflow condition of a user data buffer, making a determination regarding whether cell losses or an insufficient cell delay variation (CDV) compensation causes the user data buffer to reach the underflow condition.

16. The method of claim 10, wherein in accordance with the cell handling second criteria the sequence number of the received cell is utilized to determine whether one of the following occurs: (1) generating dummy data; (2) discarding the received cell and generating the dummy data.

17. A method of monitoring cell arrival in an asynchronous transfer mode (ATM) network, the method comprising:
   using a cell handling first criteria for attempting to recognize a received cell as a next expected cell; when a handling decision regarding the received cell is not feasible using the cell handling first criteria and when a predetermined condition of a user data buffer is reached, using a cell handling second criteria for processing the received cell;
   wherein recognizing the received cell as the next expected cell involves verification that a sequence number of the received cell is in sequence with a last received cell and that a sequence number validity flag is of a predetermined value.

18. A method of monitoring cell arrival in an asynchronous transfer mode (ATM) network, the method comprising:
   (a) using a cell handling first criteria for attempting to recognize a received cell as a next expected cell
   (b) when a handling decision regarding the received cell is not feasible using the cell handling first criteria and when a predetermined condition of a user data buffer is reached, using a cell handling second criteria for processing the received cell;
   (c) upon the user data buffer reaching the predetermined condition:
      (1) loading dummy data into the user data buffer; and
      (2) analyzing a next received cell and considering the next received cell as a late arrived cell indicative of insufficient cell delay variation compensation (CDV) if it is recognized as being the cell that has just been replaced with the dummy data.

19. A method of monitoring cell arrival in an asynchronous transfer mode (ATM) network, the method comprising:
   (a) using a cell handling first criteria for attempting to recognize a received cell as a next expected cell;
   (b) delaying a cell handling decision of the received cell when the handling decision is not feasible using the cell handling first criteria, the delaying continuing until either of the following events occur:
      (1) reception of a subsequent cell;
      (2) an underflow condition of a user buffer; and
   (c) using a cell handling second criteria for processing the received cell upon the occurrence of either event (1) or (2) of step (b).

20. The method of claim 19, wherein the underflow condition of the user data buffer is an emptying of the user data buffer to a point that reassembly of a user signal would be unstable.

21. The method of claim 19, further comprising generating dummy data while delaying a handling decision for the received cell.

22. The method of claim 19, further comprising making the handling decision prompted by the underflow condition of a user data buffer by taking into account whether a cell whose acceptance decision has been delayed is present in the cell arrival buffer.

23. The method of claim 19, further comprising, upon making the handling decision prompted by the underflow condition of a user data buffer, making a determination regarding a cause for the user data buffer to reach the underflow condition.

24. The method of claim 19, further comprising, upon making the handling decision prompted by the underflow condition of a user data buffer, making a determination regarding whether cell losses or an insufficient cell delay variation (CDV) compensation causes the user data buffer to reach the underflow condition.

25. The method of claim 19, wherein in accordance with the cell handling second criteria a sequence number of the received cell is utilized to determine whether one of the following occurs: (1) generating dummy data; (2) discarding the received cell and generating the dummy data.

26. A method of monitoring cell arrival in an asynchronous transfer mode (ATM) network, the method comprising:
   (a) using a cell handling first criteria for attempting to recognize a received cell as a next expected cell;
   (b) delaying a cell handling decision of the received cell when the handling decision is not feasible using the cell handling first criteria; and
   (c) terminating the delaying of step (b) when a predetermined condition of a user data buffer is reached, and then using a cell handling second criteria for processing the received cell;
   wherein the delaying of step (b) continues until a subsequent cell is received.

27. A method of monitoring cell arrival in an asynchronous transfer mode (ATM) network, the method comprising:
   (a) using a cell handling first criteria for attempting to recognize a received cell as a next expected cell;
   (b) delaying a cell handling decision of the received cell when the handling decision is not feasible using the cell handling first criteria; and (c) terminating the delaying of step (b) when a predetermined condition of a user data buffer is reached, and then using a cell handling second criteria for processing the received cell;

wherein recognizing the received cell as the next expected cell involves verification that a sequence number of the received cell is in sequence with a last received cell and that a sequence number validity flag is of a predetermined value.

28. A method of monitoring cell arrival in an asynchronous transfer mode (ATM) network, the method comprising:

(a) using a cell handling first criteria for attempting to recognize a received cell as a next expected cell;

(b) delaying a cell handling decision of the received cell when the handling decision is not feasible using the cell handling first criteria; and (c) terminating the delaying of step (b) when a predetermined condition of a user data buffer is reached, and then using a cell handling second criteria for processing the received cell;

(d) upon the user data buffer reaching the predetermined condition;
  (1) loading dummy data into the user data buffer; and
  (2) analyzing a next received cell and considering the next received cell as a late arrived cell indicative of insufficient cell delay variation (CDV) compensation if it is recognized as being the cell that has just been replaced with the dummy data.

29. An asynchronous transfer mode (ATM) cell arrival monitoring system comprising:

a cell arrival buffer into which incoming ATM cells are loaded;

a user data buffer for containing data for reassembly of a constant bit rate signal;

a controller which transfers data included in a cell in the cell arrival buffer into the user data buffer if the controller recognizes the cell in the cell arrival buffer as the next expected cell, the controller instead delaying an acceptance decision for the cell if it is not recognized as the next expected cell until either reception of a subsequent cell in the cell arrival buffer or until the acceptance decision is prompted by a predetermined condition of a user data buffer.

30. The system of claim 29, wherein the predetermined condition of the user data buffer is an emptying of the user data buffer to a point that reassembly of a user signal would be unstable.

31. The system of claim 29, further comprising a dummy data generator which generates dummy data when necessary while the controller delays an acceptance decision for the cell.

32. The system of claim 29, wherein the controller recognizes the cell as the next expected, cell by verifying that a sequence number of the received cell is in sequence with a last received cell and that a sequence number validity flag is of a predetermined value.

33. The system of claim 29, wherein the controller makes the acceptance decision prompted by the predetermined condition of the user data buffer by taking into account whether a cell whose acceptance decision has been delayed is present in the cell arrival buffer.

34. The system of claim 29, wherein the controller, upon making the acceptance decision prompted by the predetermined condition of a user data buffer, makes a determination regarding a cause for the user data buffer to reach the predetermined condition.

35. The system of claim 29, wherein the controller, upon making the acceptance decision prompted by the predetermined condition of a user data buffer, makes a determination regarding whether cell losses or an insufficient cell delay variation (CDV) compensation causes the user data buffer to reach the predetermined condition.

36. An asynchronous transfer mode (ATM) telecommunications network comprising:

a transmitter which generates a constant bit rate (CBR) signal;

a first interface which inserts the constant bit rate signal into ATM cells;

a second interface which receives ATM cells and generates therefrom the constant bit rate signal, the second interface including a cell arrival monitor, the cell arrival monitor comprising:

a cell arrival buffer into which incoming ATM cells are loaded;

a user data buffer for containing data for reassembly of a constant bit rate signal;

a controller which transfers data included in a cell in the cell arrival buffer into the user data buffer if the controller recognizes the cell in the cell arrival buffer as a next expected cell, the controller instead delaying an acceptance decision for the cell if it is not recognized as the next expected cell until either reception of a subsequent cell in the cell arrival buffer or until the acceptance decision is prompted by a predetermined condition of a user data buffer; and an ATM physical layer medium which carries the ATM cells from the first interface to the second interface.

37. An asynchronous transfer mode (ATM) cell arrival monitoring system comprising:

a cell arrival buffer into which incoming ATM cells are loaded;

a user data buffer for containing data for reassembly of a constant bit rate signal;

a controller which transfers data included in a cell in the cell arrival buffer into the user data buffer if the controller recognizes the cell in the cell arrival buffer as a next expected cell, the controller instead delaying an acceptance decision for the cell if it is not recognized as the next expected cell until either reception of a subsequent cell in the cell arrival buffer or until the acceptance decision is prompted by a predetermined condition of a user data buffer.

38. The system of claim 37, wherein the predetermined condition of the user data buffer is an emptying of the user data buffer to a point that reassembly of a user signal would be unstable.

39. The system of claim 37, further comprising a dummy data generator which generates dummy data when necessary while the controller delays an acceptance decision for the cell.

40. The system of claim 37, wherein the controller recognizes the cell as the next expected cell by verifying that a sequence number of the received cell is in sequence with a last received cell and that a sequence number validity flag is of a predetermined value.

41. The system of claim 37, wherein the controller makes the acceptance decision prompted by the predetermined condition of the user data buffer by taking into account whether a cell whose acceptance decision has been delayed is present in the cell arrival buffer.

42. The system of claim 37, wherein the controller, upon making the acceptance decision prompted by the predetermined condition of a user data buffer, makes a determination regarding a cause for the user data buffer to reach the predetermined condition.

43. The system of claim 37, wherein the controller upon making the acceptance decision prompted by the predetermined condition of a user data buffer, makes a determination regarding whether cell losses or an insufficient cell delay variation (CDV) compensation causes the user data buffer to reach the predetermined condition.

44. The system of claim 37, wherein the cell arrival monitor is included in an interworking unit.

* * * * *